United States Patent
Ikegami

(10) Patent No.: US 7,949,906 B2
(45) Date of Patent: May 24, 2011

(54) MANAGEMENT SUPPORTING SYSTEM, MANAGEMENT SUPPORTING METHOD, AND MANAGEMENT SUPPORTING PROGRAM

(75) Inventor: Teruya Ikegami, Tokyo (JP)

(73) Assignee: NEC Corporation, Tokyo (JP)

( * ) Notice: Subject to any disclaimer, the term of this patent is extended or adjusted under 35 U.S.C. 154(b) by 378 days.

(21) Appl. No.: 11/989,397

(22) PCT Filed: Jul. 26, 2006

(86) PCT No.: PCT/JP2006/314796
§ 371 (c)(1),
(2), (4) Date: Feb. 20, 2008

(87) PCT Pub. No.: WO2007/013527
PCT Pub. Date: Feb. 1, 2007

(65) Prior Publication Data
US 2009/0265585 A1    Oct. 22, 2009

(30) Foreign Application Priority Data
Jul. 27, 2005   (JP) ................................ 2005-217918

(51) Int. Cl.
G06F 11/00 (2006.01)
(52) U.S. Cl. .......................................... 714/57; 714/26
(58) Field of Classification Search ............... 714/26, 714/27, 57
See application file for complete search history.

(56) References Cited

U.S. PATENT DOCUMENTS

| | | | |
|---|---|---|---|
| 5,748,880 A | | 5/1998 | Ito et al. |
| 5,963,939 A | * | 10/1999 | McCann et al. ............ 1/1 |
| 7,610,512 B2 | * | 10/2009 | Gerber ....................... 714/26 |
| 7,620,848 B1 | * | 11/2009 | Tanner ....................... 714/25 |
| 2005/0015665 A1 | | 1/2005 | Kato et al. |
| 2008/0065577 A1 | * | 3/2008 | Chefalas et al. ............ 706/47 |

FOREIGN PATENT DOCUMENTS

| | | |
|---|---|---|
| JP | 05-244156 | 9/1993 |
| JP | 06-309172 | 11/1994 |
| JP | 07-253956 | 10/1995 |

(Continued)

*Primary Examiner* — Bryce P Bonzo
(74) *Attorney, Agent, or Firm* — Foley & Lardner LLP

(57) ABSTRACT

An object of the present invention is to enable a user to grasp the operation of the autonomous system for executing a countermeasure corresponding to a state of a system to be managed and to enable the user to check if a problem has been solved after the countermeasure taken against the problem of the system to be managed is performed by the user or by the autonomous system when the countermeasure performed by the autonomous system has failed or when the user wants to confirm the solution by the countermeasure performed by the autonomous system. An autonomous collaborative work operation control section 6 indistinctively records the content of a countermeasure corresponding to a manual operation and the content of a countermeasure taken not by the manual operation but by an autonomous operation in an autonomous collaborative work log storage section 5. The autonomous collaborative work operation control section 6 and autonomous collaborative work screen drawing section 7 display the fault of a system to be managed the solution of which has not been confirmed to allow the user to select an unresolved fault. Further, the autonomous collaborative work operation control section 6 and autonomous collaborative work screen drawing section 7 displays a screen for determining the countermeasure content for solving the fault. The autonomous collaborative work operation control section 6 executes the countermeasure according to the operation performed by the user and adds a log.

8 Claims, 22 Drawing Sheets

FOREIGN PATENT DOCUMENTS

| | | |
|---|---|---|
| JP | 10-229396 | 8/1998 |
| JP | 10-312321 | 11/1998 |
| JP | 2001-014187 A | 1/2001 |
| JP | 2001-142727 A | 5/2001 |
| JP | 2002-190800 A | 7/2002 |
| JP | 2003-256367 A | 9/2003 |
| JP | 2003-296082 A | 10/2003 |
| JP | 2005-038223 A | 2/2005 |

* cited by examiner

FIG.2

| RULE ID | CONDITION | ACTION | SERVER | AUTHORIZATION |
|---------|-----------|--------|--------|---------------|
| R0001 | EventA1 | actionA1 | serverA | NOT NECESSARY |
| R0002 | EventA2*EventA3 | actionA2 | serverA | NECESSARY |
| R0003 | EventB2 | actionB1,actionB2 | serverB | NOT NECESSARY |
| R0004 | EventB3+EventB4 | actionB3,actionB4 | serverB | NOT NECESSARY |
| R0005 | EventA1 | actionC1 | serverC | NOT NECESSARY |
| R0006 | EventC1+EventC2 | actionC1,actionC2,actionC3 | serverC | NECESSARY |

FIG.3

| LOG ID | SERVER | CONDITION | WORKER | WORK DATE | CONTENT OF COUNTERMEASURE | ACTION | RESULT | RULE ID |
|---|---|---|---|---|---|---|---|---|
| L0001 | serverA | EventA1 | auto<br>auto | 2004/7/12 12:02<br>2004/7/12 12:20 | APPLY<br>SOLUTION CONFIRMATION | actionA1<br>- | SUCCESS<br>FINISHED | R0001<br>- |
| L0002 | serverD | EventD1 | opeB<br>opeA | 2004/7/12 11:02<br>2004/7/12 11:20 | APPLY<br>SOLUTION CONFIRMATION | actionD1<br>- | SUCCESS<br>FINISHED | - <br>- |
| L0003 | serverA | EventA2*EventA3 | auto<br>opeA<br>opeA | 2004/7/12 10:17<br>2004/7/12 10:20<br>2004/7/12 10:25 | AUTHORIZATION REQUEST<br>APPLY<br>SOLUTION CONFIRMATION | actionA2<br>actionA2<br>- | -<br>SUCCESS<br>FINISHED | R0002<br>R0002<br>- |
| L1000 | serverC | EventA1 | auto | 2004/7/12 02:35 | APPLY | actionC1 | FAILURE | R0005 |

FIG.5

UNRESOLVED FAULT LIST

| FAULT (CONDITION) | LOCATION OF OCCURRENCE | ACTION | DATE OF OCCURRENCE | PROGRESS OF COUNTERMEASURE |
|---|---|---|---|---|
| EventA1 | serverC | actionC1 | 2004/11/14  12:25 | FAILURE [auto] |
| EventB2 | serverB | actionB2 | 2004/11/14  11:20 | SUCCESS [auto] |
| EventD1 | serverD | actionD1 | 2004/11/14  10:36 | WORKING ON COUNTERMEASURE [opeB] |

[REFERENCE]

UNRESOLVED FAULT LIST

1601

| FAULT (CONDITION) | LOCATION OF OCCURRENCE | ACTION | DATE OF OCCURRENCE | PROGRESS OF COUNTERMEASURE |
|---|---|---|---|---|
| EventA1 | serverC | actionC2 | 2004/11/14 12:35 | SUCCESS [opeA] |
| EventB2 | serverB | actionB2 | 2004/11/14 11:20 | SUCCESS [auto] |

[REFERENCE]

FIG.14

FAULT HISTORY INFORMATION [EventA1 200411141225] — 2201

| FAULT (CONDITION) | EventA1 |
|---|---|

LOCATION OF OCCURRENCE [SERVER NAME] serverC

DATE OF OCCURRENCE  2004/11/14 12:25    DATE OF SOLUTION  2004/11/14 12:38

COUNTERMEASURE HISTORY: — 2202

| DATE | OPERATOR | CONTENT OF PROCESSING | | |
|---|---|---|---|---|
| 20041114 12:27 | auto | acitonC1 | APPLIED | FAILURE |
| 20041114 12:35 | opeA | acitonC2 | APPLIED | SUCCESS |
| 20041114 12:35 | opeA | - | SOLUTION CONFIRMATION | - |

SIMILAR EVENT : THREE — 2203

| DATE OF OCCURRENCE | DATE OF SOLUTION | ACTION [EXECUTANT] |
|---|---|---|
| 20041114 12:27 | 20041114 12:38 | acitonC2 [opeA] |
| 20041010 15:40 | 20041010 15:48 | acitonC2 [opeA] |
| 20040418 02:10 | 20041114 02:24 | acitonC2 [opeA] |

[RULE EDIT] — 2204    [CLOSE]

AUTONOMOUS RULE EDIT [EventA1 serverC]

FAULT (CONDITION)     EventA1
LOCATION OF [SERVER NAME] serverC    NUMBER OF OCCURRENCES : THREE
OCCURRENCE

AUTONOMOUS RULE                                2302

| ACTION | DATE OF CREATION OF RULE | AUTHORIZATION | NUMBER OF SUCCESSES/NUMBER OF APPLICATIONS |
|---|---|---|---|
| AcitonC1 | 20040401 12:20 | NOT REQUIRED | 00/03 |

[CREATE] [EDIT] [DELETE]

COUNTERMEASURE ACTION                          2303

| ACTION | DATE OF APPLICATION | EXECUTANT | RESULT |
|---|---|---|---|
| AcitonC2 | 20041114 12:38 | poeA | SUCCESS |
| AcitonC2 | 20041010 15:45 | poeA | SUCCESS |
| AcitonC2 | 20040418 02:21 | poeA | SUCCESS |

[REGISTRATION]

[CLOSE]

AUTONOMOUS RULE EDIT [EventB2 serverB]

FAULT (CONDITION)　　　　EventB2
LOCATION OF OCCURRENCE [SERVER NAME] serverB　　NUMBER OF OCCURRENCES : ELEVEN

AUTONOMOUS RULE　　　　2402

| ACTION | DATE OF CREATION OF RULE | AUTHORIZATION | NUMBER OF SUCCESSES/NUMBER OF APPLICATIONS |
|---|---|---|---|
| AcitonA1 | 20040425 10:15 | NOT REQUIRED | 11/11 |
| AcitonA2 | 20040425 10:15 | NOT REQUIRED | 11/11 |

[CREATE] [EDIT] [DELETE]

COUNTERMEASURE ACTION　　　2403

| ACTION | DATE OF APPLICATION | EXECUTANT | RESULT |
|---|---|---|---|
| | | | |

[REGISTRATION]

[CLOSE]

FIG. 17

| AUTONOMOUS RULE EDIT [EventB2 serverB] |
|---|

FAULT (CONDITION)   EventB2
LOCATION OF OCCURRENCE [SERVER NAME] serverB   NUMBER OF OCCURRENCES : ELEVEN

AUTONOMOUS RULE                                              2502

| ACTION | DATE OF CREATION OF RULE | NUMBER OF SUCCESSES/NUMBER OF APPLICATIONS |
|---|---|---|
| AcitonA1 | 20040425 10:15 | 11/11 |
| AcitonA2 | 20040425 10:15 | 11/11 |
| SOLUTION CONFIRMATION | 20041115 12:32 | 00/00 |

[CREATE] [EDIT] [DELETE]

COUNTERMEASURE ACTION

| ACTION | DATE OF APPLICATION | EXECUTANT | RESULT |
|---|---|---|---|
|  |  |  |  |

[REGISTRATION]

[CLOSE]

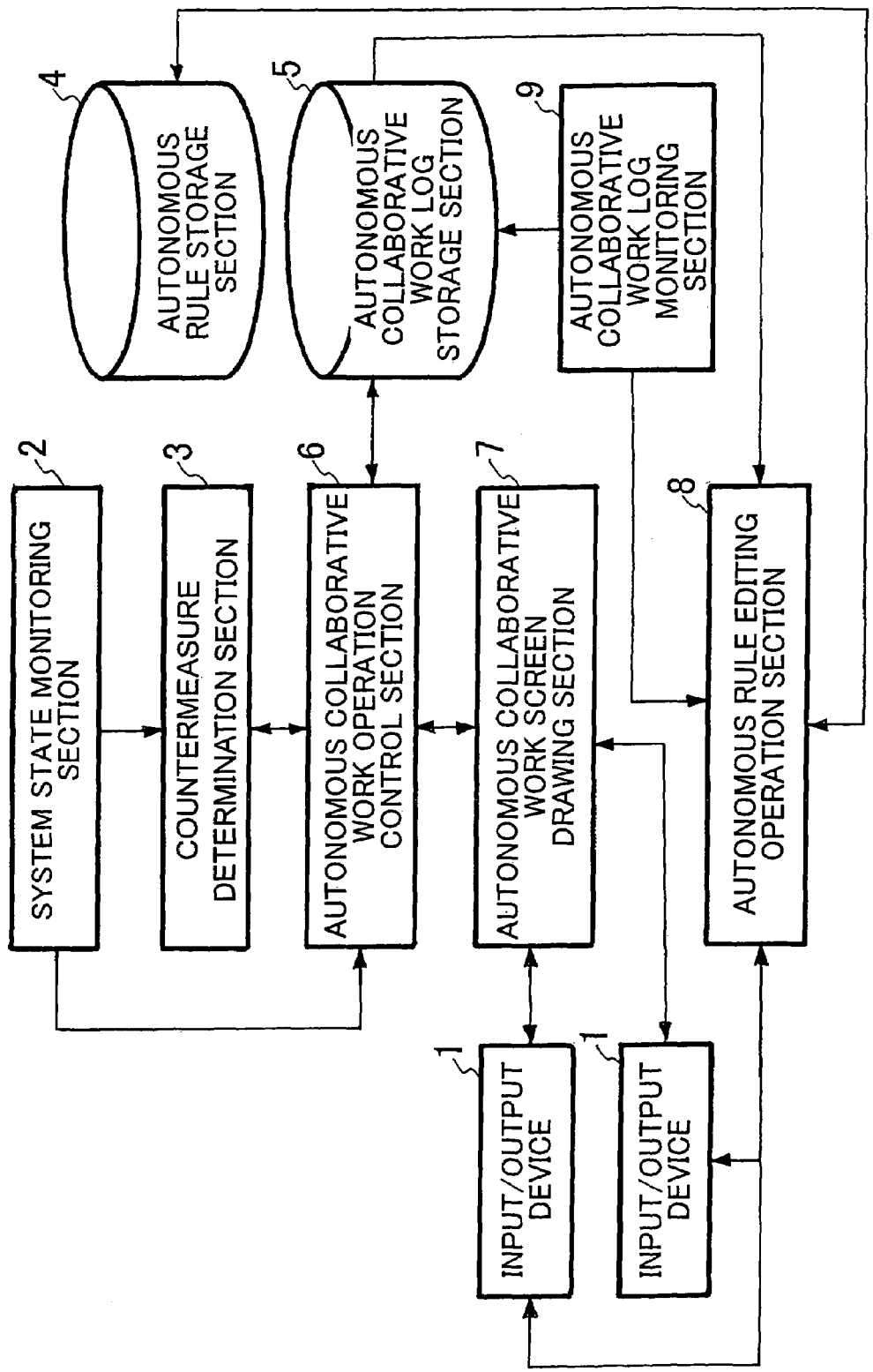

FIG.19

FAULT HISTORY LIST

| ALL | AUTONOMOUS COUNTERMEASURE | MANUAL COUNTERMEASURE | AUTONOMOUS RULE FAILURE REPORT |

| RULE ID | CONDITION | ACTION | SERVER | REPORT | |
|---------|-----------|--------|--------|--------|---|
| R0006 | EventC1+EventC2 | actionC1,actionC2, actionC3 | serverC | ! | PROCESSING HAS FAILED FIVE TIMES IN SUCCESSION |
| R0003 | EventB2 | actionB1,actionB2 | serverB | ! | PROCESSING HAS FAILED TEN TIMES IN TOTAL |
| R0005 | EventA1 | actionC1 | serverC | ! | SUCCESS RATE IS 20% OR LESS |
| R0002 | EventA2*EventA3 | actionA2 | serverA | ? | PROCESSING HAS FAILED AFTER TEN CONSECUTIVE SUCCESSES |

REFERENCE

FIG.20

[ALERT] AUTONOMOUS RULE IS LIKELY TO BE INADEQUATE

3201

! NUMBER OF CONSECUTIVE FAILURES OF FOLLOWING RULE
EXCEEDS SPECIFIED NUMBER.
CONFIRM WHETHER RULE IS ADEQUATE OR NOT.

R0006

CONDITION          · EventC1 + EventC2
ACTION             · actionC1, actionC2, actionC3
SERVER             · serverC
AUTHORIZATION      · REQUIRED

FAILURE REPORT     : PROCESSING HAS FAILED FIVE TIMES IN SUCCESSION

MORE DETAILED
INFORMATION

RULE EDIT

FIG.21

[ALERT] AUTONOMOUS RULE HAS FAILED FOR REASON DESCRIBED BELOW

3301

[?] FOLLOWING RULE HAS FAILED FOR SOME REASON.
YOU NEED TO CONFIRM CAUSE OF FAILURE.

R0002

CONDITION  ・EventA2★EventA3
ACTION     ・actionA2
SERVER     ・serverA  [LATEST SYSTEM CONFIGURATION CHANGE]
AUTHORIZATION ・REQUIRED

[!]

FAILURE REPORT : PROCESSING HAS FAILED AFTER TEN CONSECUTIVE SUCCESSES

| MORE DETAILED INFORMATION | RULE EDIT |

FIG.22

AUTONOMOUS RULE DETAILED INFORMATION [R0006]

R0006

| | |
|---|---|
| CONDITION | ·EventC1+ EventC2 |
| ACTION | ·actionC1,actionC2,actionC3 |
| SERVER | ·serverC |
| AUTHORIZATION | ·REQUIRED |

[!] NUMBER OF CONSECUTIVE FAILURES OF THIS RULE EXCEEDS SPECIFIED NUMBER.
CONFIRM WHETHER RULE IS ADEQUATE OR NOT.

NUMBER OF SUCCESSES / NUMBER OF APPLICATIONS : 5/20
NUMBER OF CONSECUTIVE TIMES OF FAILURE : FIVE TIMES
SUCCESS RATE : 25%

FAULT HISTORY TO WHICH THIS RULE HAS BEEN APPLIED : 25 TIMES

| DATE OF OCCURRENCE | DATE OF SOLUTION | SUCCESS/FAILURE |
|---|---|---|
| 20040425 10:15 | 20040425 12:15 | FAILURE |
| 20040325 13:45 | 20040325 18:00 | FAILURE |
| 20040322 12:15 | 20040323 06:02 | FAILURE |

[REFERENCE]

[RULE EDIT] [CLOSE]

MANAGEMENT SUPPORTING SYSTEM, MANAGEMENT SUPPORTING METHOD, AND MANAGEMENT SUPPORTING PROGRAM

This application is the National Phase of PCT/JP2006/314796, filed Jul. 26, 2006, which claims priority to Japanese Application No. 2005-217918, filed Jul. 27, 2005, the disclosures of which are hereby incorporated by reference in their entirety.

TECHNICAL FIELD

The present invention relates to a management supporting system, a management supporting method, a management supporting program, which are applied to operation and management of a system requiring high reliability and high availability.

BACKGROUND ART

In operation management work of a system (system to be managed) requiring high reliability and high availability, an autonomous system is now being introduced. The autonomous system is a system operating according to rules such as an if-then type rule. The autonomous system assumes in advance given conditions that are likely to occur in a system to be managed, describes countermeasures (actions) as rules for responding to the assumed conditions if they happen, and stores the rules therein. When the system to be managed falls into the condition specified in the rules, the autonomous system automatically executes the countermeasure (action) specified in the rules for the system to be managed. As described above, the autonomous system is configured to immediately execute a correct countermeasure for the system to be managed.

However, many administrators are distrustful of the autonomous system which autonomously executes processing related to a critical issue such as countermeasure against a system fault out of sight of them. Such administrators are likely to hesitate to introduce the autonomous system.

Further, the autonomous system executes the abovementioned actions to the system to be managed according to rules. Therefore, in the case where the system to be managed falls into an unknown condition that is not described in the rules, the system cannot autonomously respond to it. In such a case, the condition requiring manual operation may be left untreated.

Further, it is substantially impossible to assume in advance all conditions possibly occurring in the system to be managed and set rules completely covering the assumed conditions. In addition, in order to create countermeasures having higher reliability, a rule creator needs to have high level technical knowledge and responsibility and, therefore, a large burden is imposed on the rule creator.

There have been proposed systems for managing policies (rule) (see, e.g., Patent Document 1). A policy management system for managing various kinds of policy for managing and controlling a network, which has been described in Patent Document 1, is provided with a means for setting up a plurality of policy data corresponding to each of a plurality of management target identification information corresponding to the network and a means for referring to a policy application state data to be updated and stored on the basis of the execution result of a command for setting the policy data updated and stored by the setting means in the network and selecting a suitable command for setting up the policy data in the network. With the above configuration, the policy management network disclosed in Patent Document 1 reduces a burden on an administrator involved in policy setting.

However, the system disclosed in Patent Document 1 needs to be provided with a setting means corresponding to the policy data. Thus, policy setting involving manual operation or policy setting of information such as a procedure manual cannot be handled by administrators other than those having high level knowledge and experience.

Patent Document 2 discloses a network management system. This network management system is provided with a means for detecting a fault occurring on a network, a means for storing operating indexes used for fault countermeasure, a means for taking out an operating index corresponding to a detected fault, a means for displaying the operating index, and a means for an operator to execute fault countermeasure according to the operating index, thereby enabling a network administrator to quickly take a countermeasure against the fault.

However, in the system disclosed in Patent Document 2, the operating indexes need to be previously classified according to the type of all the faults possibly occurring and, in the case where a fault that the system has not assumed occurs, fault countermeasure operation stops.

Patent Document 1: JP-A-2002-190800 (paragraphs 0035 to 0104)

Patent Document 2: JP-A-05-244156 (paragraphs 0007 to 0014)

DISCLOSURE OF THE INVENTION

Problems to be Solved by the Invention

That is, conventional autonomous systems have the following problems. A first problem is that many users are distrustful of the autonomous system which autonomously operates and hesitate to introduce it. Even if the autonomous system is introduced, it is impossible to respond to events other than those specified in the rules that the autonomous system stores, which may inhibits the progress of a work.

A second problem is that users need to have high level knowledge and experience in order for them to determine whether editing of the rules is necessary or not and to determine how to set/change the rules. Thus, a large burden is imposed on the users.

An object of the present invention is, therefore, to allow users to grasp the operation of the autonomous system so that the users (administrator or the like) are not distrustful of the autonomous system and to allow the users to perform countermeasures for a system to be managed in the case where a countermeasure taken by the autonomous system fails or allow the users to confirm the solutions given by the autonomous system.

Another object of the present invention is to reduce a burden on the users who add/edit rules while managing the autonomous system which operates according to the rules.

Means for Solving the Problems

To solve the above problem, according to a first aspect of the present invention, there is provided a management supporting system for supporting management of a system to be managed characterized by comprising: a rule storage section which stores a rule describing a countermeasure corresponding to a state of the system to be managed; an input/output section which displays a screen operable by an operator and receives as an input an instruction from the operator; a countermeasure execution means for monitoring a state of the system to be managed, executes for the system to be managed a countermeasure corresponding to the state of the system to be managed based on the rule stored in the rule storage section and, in the case where an instruction is input to the input/output section from the operator, executes a countermeasure for the system to be managed according to the instruction; a log storage section which stores, in the same format, the operation of the countermeasure execution means executed according to the rule stored in the rule storage section and operation of the countermeasure execution means executed according to the instruction from the operator as logs; and an unresolved state display control means for displaying on the input/output section based on the logs stored in the log storage section a screen presenting information presenting a state which has occurred in the system to be managed and the problem solution (solution confirmation) for which has not yet been completed.

According to the above configuration, the log storage section stores, in the same format, the operation of the countermeasure execution means executed according to the rule stored in the rule storage section and operation of the countermeasure execution means executed according to the instruction from the operator as logs, and the unresolved state display control means displays on the input/output section based on the logs a screen presenting information presenting a state which has occurred in the system to be managed and the problem solution (solution confirmation) for which has not yet been completed. Thus, the user can grasp the operation executed not by a human but according to the rule, which may cast aside user (administrator)'s distrust of the autonomous system.

After displaying the screen on the input/output section, the unresolved state display control means may display on the input/output section according to the operator's instruction a screen prompting the operator to input a countermeasure instruction for the state in which the problem solution has not yet been completed.

According to the above configuration, a screen prompting the operator to input a countermeasure instruction for the state in which the problem solution has not yet been completed is displayed. Thus, the user can perform a countermeasure for the system to be managed or solution confirmation of a countermeasure taken not by a human but according to the rule.

The management supporting system may further comprise a resolved state display control means for displaying on the input/output section based on the logs stored in the log storage section a screen presenting information concerning a state which has occurred in the system to be managed and the problem solution for which has been completed together with information of countermeasures executed for the problem solution and success/failure of the respective countermeasures. After displaying the screen on the input/output section, the resolved state display control means may display according to the operator's instruction a rule update operation screen prompting the operator to update a rule selected by the operator.

According to the above configuration, a rule update operation screen prompting the operator to update a rule selected by the operator is displayed. Thus, the user can refer to the history of the countermeasure for the state that has occurred to correct an inadequate rule for update. As a result, it is possible to reduce a burden on the user at the time of updating the rule.

The management supporting system may further comprise a rule presentation means for specifying based on the logs stored in the log storage section a rule in which the result of a countermeasure to be executed for the system to be managed satisfies a given condition and displays on the input/output section a screen presenting the rule as one that is in great need of correction.

According to the above configuration, a rule presentation means displays on the input/output section a screen presenting the rule satisfying a given condition as one that is in great need of correction. Thus, the user can grasp a rule that is in great need of correction.

Advantages of the Invention

According to the present invention, the user can grasp the operation executed not by a human but according to the rule, which may cast aside user (administrator)'s distrust of the autonomous system. Further, the user can perform a countermeasure for the system to be managed or solution confirmation of a countermeasure taken not by a human but according to the rule. Further, it is possible to reduce a burden on the user at the time of updating the rule.

BRIEF DESCRIPTION OF THE DRAWINGS

FIG. 2 is a table for explaining examples of autonomous rules;

FIG. 3 is a table for explaining examples of autonomous collaborative work logs;

FIG. 5 is an explanatory view showing an example of an unresolved fault list screen;

FIG. 10 is an explanatory view showing an example of the unresolved fault list screen which has been regenerated;

FIG. 14 is an explanatory view of an example of a fault history information screen;

FIG. 15 is an explanatory view of an example of an autonomous rule edit screen;

FIG. 16 is an explanatory view of an example of an autonomous rule edit screen;

FIG. 17 is an explanatory view of an example of an autonomous rule edit screen;

FIG. 18 is a block diagram showing a third exemplary embodiment of the present invention;

FIG. 19 is an explanatory view of an example of a fault history list screen according to the third exemplary embodiment;

FIG. 20 is an explanatory view of an example of a dialogue presenting an autonomous rule that is considered to be in great need of correction;

FIG. 21 is an explanatory view of an example of a dialogue presenting an autonomous rule that is considered to be in great need of correction; and FIG. 22 is an explanatory view of an example of a screen presenting more detailed information of a selected autonomous rule.

EXPLANATION OF REFERENCE SYMBOLS

Figure 1:
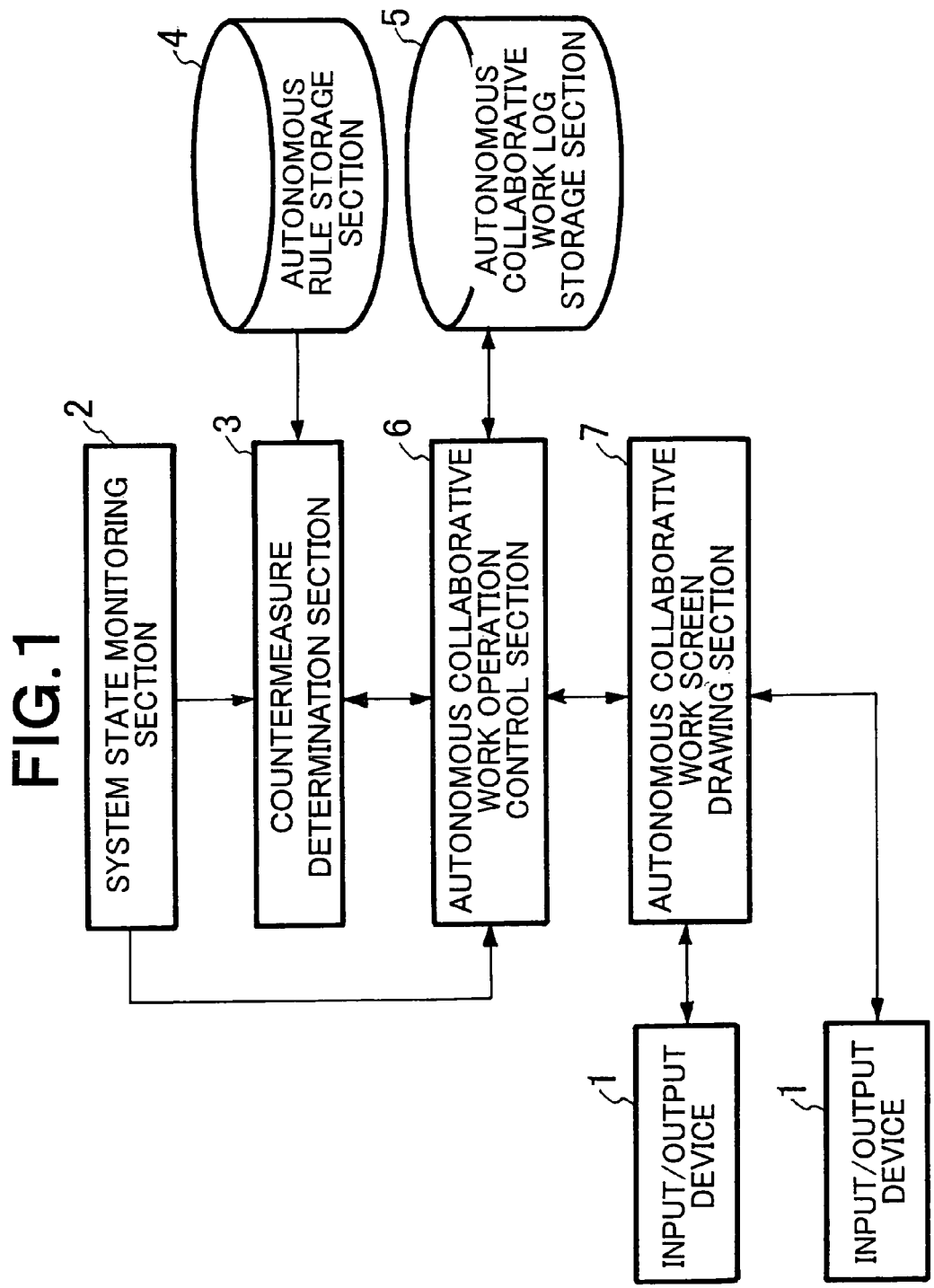
FIG. 1 is a block diagram showing a first exemplary embodiment of the present invention.

1: Input/output device
2: System state monitoring section
3: Countermeasure determination section
4: Autonomous rule storage section
5: Autonomous collaborative work log storage section
6: Autonomous collaborative work operation control section
7: Autonomous collaborative work screen drawing section
8: Autonomous rule editing operation section
9: Autonomous collaborative work log monitoring section

BEST MODE FOR CARRYING OUT THE INVENTION

Now, exemplary embodiments of the present invention will be described by referring to the accompanying drawings.

First Exemplary Embodiment

FIG. 1 is a block diagram showing a first exemplary embodiment of the present invention. A management supporting system according to the first exemplary embodiment includes n input/output devices 1, a system state monitoring section 2, a countermeasure determination section 3, an autonomous rule storage section 4, an autonomous collaborative work log storage section 5, an autonomous collaborative work operation control section 6, and an autonomous collaborative work screen drawing section 7. The number n of the input/output devices 1 is integer equal to or more than 1, and one or more operators (also can be referred to as worker) can use the input/output devices 1 simultaneously. In the present exemplary embodiment, the system state monitoring section 2, countermeasure determination section 3, and autonomous rule storage section 4 constitute an autonomous system. The autonomous system may include the autonomous collaborative work operation control section 6.

In the present exemplary embodiment, the countermeasure determination section 3, autonomous collaborative work operation control section 6, and autonomous collaborative work screen drawing section 7 especially play an important role. The processing content (countermeasure) that the countermeasure determination section 3 has determined according to an autonomous rule and content of the operation performed by the operator are input to the autonomous collaborative work operation control section 6. The autonomous collaborative work operation control section 6 executes processing corresponding to the countermeasure and stores the processing content in the autonomous collaborative work log storage section 5. Further, the autonomous collaborative work operation control section 6 allows the operator to refer to a current processing state and previous autonomous collaborative work logs through an operation screen generated by the autonomous collaborative work screen drawing section 7.

The autonomous system may autonomously execute a countermeasure both in the case where a countermeasure (action) is executed for a system to be managed (not shown) and in the case where the a countermeasure is executed according to an operator's operation. In either case, the log representing the operation of the management supporting system is described in the same format. That is, the autonomous system included in the management supporting system is treated as one operator.

The system state monitoring section 2 always or periodically monitors a state of the system to be managed. The state of the system to be managed is sometimes referred to as "condition". The system state monitoring section 2 monitors, as the condition of the system to be managed, events issued by a specific module, ping reply, CPU load, and the like. In the case where the state of the system to be managed coincides with a previously specified event or in the case where the state of the system to be managed exceeds a previously specified threshold value, the system state monitoring section 2 determines that any countermeasure needs to be taken by a human (operator or the like) or autonomous system and outputs a combination of condition information and location at which the system state monitoring section 2 has detected the condition (e.g., information of a server included in the system to be managed) to the countermeasure determination section 3 and autonomous collaborative work operation control section 6. Further, the system state monitoring section 2 monitors the progress of the countermeasure (who among operators including the autonomous system deal with the detected condition, whether the taken countermeasure has been effective or not, and the like) for the detected condition and outputs the monitored information to the autonomous collaborative work operation control section 6. Furthermore, the system state monitoring section 2 determines success/failure of the action taken by the autonomous collaborative work operation control section 6 and outputs the determination result to the autonomous collaborative work operation control section 6. A method of determining the success/failure of the action will be described later.

The countermeasure determination section 3 selects, according to the autonomous rule stored in the autonomous rule storage section 4, a countermeasure (action) corresponding to the condition (condition of the system to be managed) input from the system state monitoring section 2 and outputs an action to be executed to the autonomous collaborative work operation control section 6.

The autonomous rule storage section 4 stores an environment (server for which the action is to be executed) in which the autonomous rule is executed and autonomous rules written in association with the need of an authorization by a human in addition to a set of the condition and action. As the action, e.g., a command itself such as a shell script or one whose name is set in a series of commands is written in the autonomous rules.

FIG. 2 is a table for explaining examples of autonomous rules. In the autonomous rules as shown in FIG. 2, rule ID, condition, action to be executed according to the condition, name of server (in other words, server for which an action is to be executed) utilizing the rule, and information indicating whether an authorization by a human is required or not upon execution of an action are written in association with one another. For example, in the case where EventA2 and EventA3 are simultaneously detected in serverA, rule R0002 shown in FIG. 2 executes actionA2 after execution of an action asking for human's authorization. Further, in the case where EventB2 or EventB3 is detected in serverB, rule R0004 executes actionB3 and actionB4 in succession without execution of an action asking for human's authorization. In FIG. 2, "*" denotes "AND" and "+" denotes "OR".

Although the condition represents a fault occurrence state in the system to be managed, it may also represent states other than the fault occurrence state. That is, an object of the autonomous rule is not limited to management of the system to be managed at the time of fault occurrence. In the following description, as a matter of convenience, the condition represents a state where a fault occurs in the system to be managed.

The autonomous collaborative work operation control section 6 executes, for the system to be executed, the action output by the countermeasure determination section 3 or processing corresponding to an operation that the operator has performed using the input/output device 1. The operation that the operator has performed using the input/output device 1 is notified to the autonomous collaborative work operation control section 6. More specifically, the input/output device 1 outputs operation information representing the content of the operation to the autonomous collaborative work screen drawing section 7, and the autonomous collaborative work screen drawing section 7 outputs the operation information to the autonomous collaborative work operation control section 6. When executing the action output by the countermeasure determination section 3 or processing corresponding to the operator's operation, the autonomous collaborative work operation control section 6 records the content of the executed action, executant, execution date, execution result in the autonomous collaborative work log storage section 5. Since the autonomous system included in the management supporting system is treated as one operator as described above, the "autonomous system" may be recorded in the autonomous collaborative work log storage section 5 as an executant in some cases.

Further, the autonomous collaborative work operation control section 6 generates the progress of the countermeasure (who among operators including the autonomous system performs the countermeasure) taken for each event requiring any countermeasure on the system to be managed or information indicating success/failure of the countermeasure for the outputs from the system state monitoring section 2, countermeasure determination section 3 and autonomous collaborative work screen drawing section 7 and outputs the generated information to the autonomous collaborative work screen drawing section 7.

Specifically, the autonomous collaborative work operation control section 6 receives as an input: progress of or success/failure of the countermeasure for the condition of the system to be managed from the system state monitoring section 2; and a rule (condition of the system to be managed and action corresponding to the condition) corresponding to the condition from the countermeasure determination section 3. The autonomous collaborative work operation control section 6 outputs the above input information to the autonomous collaborative work screen drawing section 7. Further, the autonomous collaborative work operation control section 6 receives as an input operation information indicating the content of the operation made for the input/output device 1 from the autonomous collaborative work screen drawing section 7. According to the operation information, the autonomous collaborative work operation control section 6 notifies the autonomous collaborative work screen drawing section 7 of a screen to be displayed next. The operation information includes user ID of the operator, window ID of a window for which an operation has been made, work ID of a work performed by the operator, the content of the action input by the operator, and the like. The operation information described above are merely exemplary and not limited to the abovementioned information. The autonomous collaborative work operation control section 6 may execute an action for the system to be managed according to the operation information input from the autonomous collaborative work screen drawing section 7.

As described above, the countermeasure determination section 3 outputs, to the autonomous collaborative work operation control section 6, information concerning an action to be executed, and the autonomous collaborative work operation control section 6 executes the action for the system to be managed. Alternatively, however, the countermeasure determination section 3 itself may select a countermeasure (action) corresponding to the condition input from the system state monitoring section 2 according to an autonomous rule and execute the action for the system to be executed.

The autonomous collaborative work log storage section 5 stores an autonomous collaborative work log. FIG. 3 is a table for explaining examples of autonomous collaborative work logs. As shown in FIG. 3, the autonomous collaborative work log includes "Log ID", "Condition" requiring countermeasure, "Server" in which the condition has occurred, "Worker", "Work date", "Content of countermeasure", "Action", and "Result" of the action in association with one another. In the case where the autonomous system executes an action, the above information are written in the autonomous collaborative work log together with rule ID of the autonomous rule from which the action has been derived. In FIG. 3, "auto" means an autonomous system.

"Content of countermeasure" includes "Apply" "Authorization request", "Authorization reject", and "Solution confirmation". "Apply" means execution of an action. "Authorization request" means a request of authorization for the execution of an action, which is made to a supervisor or the like. "Authorization reject" means rejection to the authorization request of the execution of an action. "Solution confirmation" means that an action has been executed and a problem in the system to be managed has been resolved. When "Apply", "Authorization request", or "Solution confirmation" is specified as "Content of countermeasure", the specified one is recorded in the autonomous collaborative work log. An execution of "Solution confirmation" means that the countermeasure for a fault has been completed, i.e., a problem has been resolved. In the case where "Solution confirmation" has not been executed, it is not determined that a problem has been solved even if the individual operations such as "Apply" of the action have been completed.

The autonomous collaborative work operation control section 6 allocates one log ID to the condition to deal with detected by the system state monitoring section 2. The number of workers or contents of the countermeasure which corresponds to one log ID is not limited to one. For example, there may be a case where someone (including the autonomous system) performs the countermeasure operation and the other confirms the solution. As the procedure progresses in a stepwise manner as described above, the autonomous collaborative work operation control section 6 adds information such as "Worker", "Work date", "Content of countermeasure" as new information corresponding to the allocated log ID.

For example, log L0001 represents that the autonomous system (auto) has applied (executes) an action actionA1 to the system to be managed according to an autonomous rule R0001 and, at the time point of the application, has once finished the countermeasure operation. The log L0001 further represents that the autonomous system has resumed the work, has confirmed whether the countermeasure has normally been completed and a problem has been resolved (i.e., whether the condition of a server in which a fault has occurred has become a state not requiring a countermeasure), and has finished the countermeasure operation. Although in this example the autonomous system performs the solution confirmation in the log L0001, the solution confirmation is performed by a human in principle. However, in the case where it is empirically known that there is a high possibility that the problem has been resolved when the application result of a specified action is success, the autonomous system may perform the solution confirmation.

Log L0003 represents that the autonomous system (auto) has executed "Authorization request" concerning execution of an action actionA2 according to an autonomous rule R0002 and, at the time point of the execution of "Authorization request", has once finished the countermeasure operation. The log L0003 further represents that operator opeA has confirmed that the action actionA2 whose authorization has been requested from the autonomous system and has applied the action actionA2 to the system to be managed. The log L0003 further represents that the operator opeA has executed solution confirmation and has finished the countermeasure operation.

Log L1000 represents that the autonomous system (auto) has applied an action actionC1 to the system to be managed according to an autonomous rule R0005 which, however, has resulted in failure and, at this time point, has once finished the countermeasure operation. That is, the log L1000 represents that a condition EventA1 of server serverC has not yet been resolved, i.e., the countermeasure operation has not been completed.

The autonomous collaborative work operation control section 6 creates the autonomous collaborative work log based on the information input from the other sections (e.g., system state monitoring section 2, countermeasure determination section 3, and autonomous collaborative work screen drawing section 7) and stores it in the autonomous collaborative work log storage section 5.

The autonomous collaborative work screen drawing section 7 receives the output from the autonomous collaborative work operation control section 6, generates information of a screen for performing an autonomous collaborative work, and outputs it to the input/output device 1. Further, the autonomous collaborative work screen drawing section 7 receives an operation information input from the input/output device 1 and outputs the input information to the autonomous collaborative work operation control section 6. The screens for performing the autonomous collaborative work are, for example, those shown in FIGS. 5 to 10 to be described later. The information of the screen is one describing the screen using a language such as HTML or XML for displaying the screen. In the following description, "to generate information of a screen" is sometimes referred to merely as "to generate a screen".

As described above, the autonomous collaborative work operation control section 6 executes an action for the system to be managed based on the information from the system state monitoring section 2 and countermeasure determination section 3. In the case where an authorization is required for the execution of an action, the action cannot be applied without an authorization by an operator. Further, "Solution confirmation" after the success of the action is performed by a human in principle. Therefore, the execution of an action by the autonomous system included in the management supporting system is not entirely automated, but is partly automated. Using the input/output devices 1, a plurality of operators enter into the partly-automated work. Such a work for leading to "Solution confirmation" based not only on the operation of the autonomous system but on the operation by a human is referred to as "autonomous collaborative work". As has been described above, an object of the autonomous rule is not limited to management of the system to be managed at the time of fault occurrence. However, in this exemplary embodiment, a management of the system to be managed at the time of fault occurrence is described as a matter of convenience.

It should be noted that there is also a case where a human specifies an action so as to make an authorization request and another human executes the action according to the authorization request.

A determination of success/failure of the application (execution) of an action, which is made by the system state monitoring section 2 will next be described. After the autonomous collaborative work operation control section 6 executes an action for the system to be managed, the system state monitoring section 2 determines the success of the execution result of the action when the following condition is satisfied. That is, when a condition "the condition of the system to be managed is changed after the execution of the action, and, there exists no autonomous rule corresponding to the condition after the change" is satisfied, the system state monitoring section 2 determines the success of the execution result of the action. The autonomous rule corresponding to the condition after the change is an autonomous rule including information of the condition after the change and information of an action to be executed when the corresponding condition occurs. When there is any autonomous rule corresponding to the condition after the change, which means the condition after the change is still in a fault state, the autonomous system applies another action to the system to be managed according to the autonomous rule. In the case where an authorization is required for the application of the action, "Authorization request" is made (specifically, information representing the authorization request is displayed on the input/output device 1 together with information of the action to prompt the operator to execute the action).

When the condition "the condition of the system to be managed is changed after the execution of the action, and, there exists no autonomous rule corresponding to the condition after the change" is not satisfied after the execution of an action for the system to be managed, the system state monitoring section 2 determines the failure of the execution result of the action. For example, in the case where the condition of the system to be managed has not been changed after the execution of the action, the system state monitoring section 2 determines the failure of the execution result of the action. In this case, the autonomous collaborative work operation control section 6 may instruct the autonomous collaborative work screen drawing section 7 to display information notifying the operator of the failure of the execution result of the action.

Even in the case where the condition "the condition of the system to be managed is changed after the execution of the action, and, there exists no autonomous rule corresponding to the condition after the change" is satisfied and where the success of the execution result of the action is determined, there is a possibility that any fault has occurred in the condition after the change and that a corresponding autonomous rule is not prepared (stored). Thus, even in the case where the success of the execution result of the action is determined, the solution confirmation is performed by a human. Therefore, even in the case of the success, a fault occurrence state can be determined by a human at the time of the solution confirmation. In this case, a human operates the input/output device 1 to allow the autonomous collaborative work operation control section 6 to apply an action once again to the system to be managed according to the operation information. At this time, the autonomous collaborative work operation control section 6 stores the information concerning the operation as the autonomous collaborative work log.

Next, with fault countermeasure operation for a fault that has occurred in the system to be managed taken as an example of the autonomous collaborative work, management supporting operation for the system to be managed performed by the management supporting system will be described. In addition, an example of a screen that the autonomous collaborative work screen drawing section 7 generates will be described.

Figure 4:
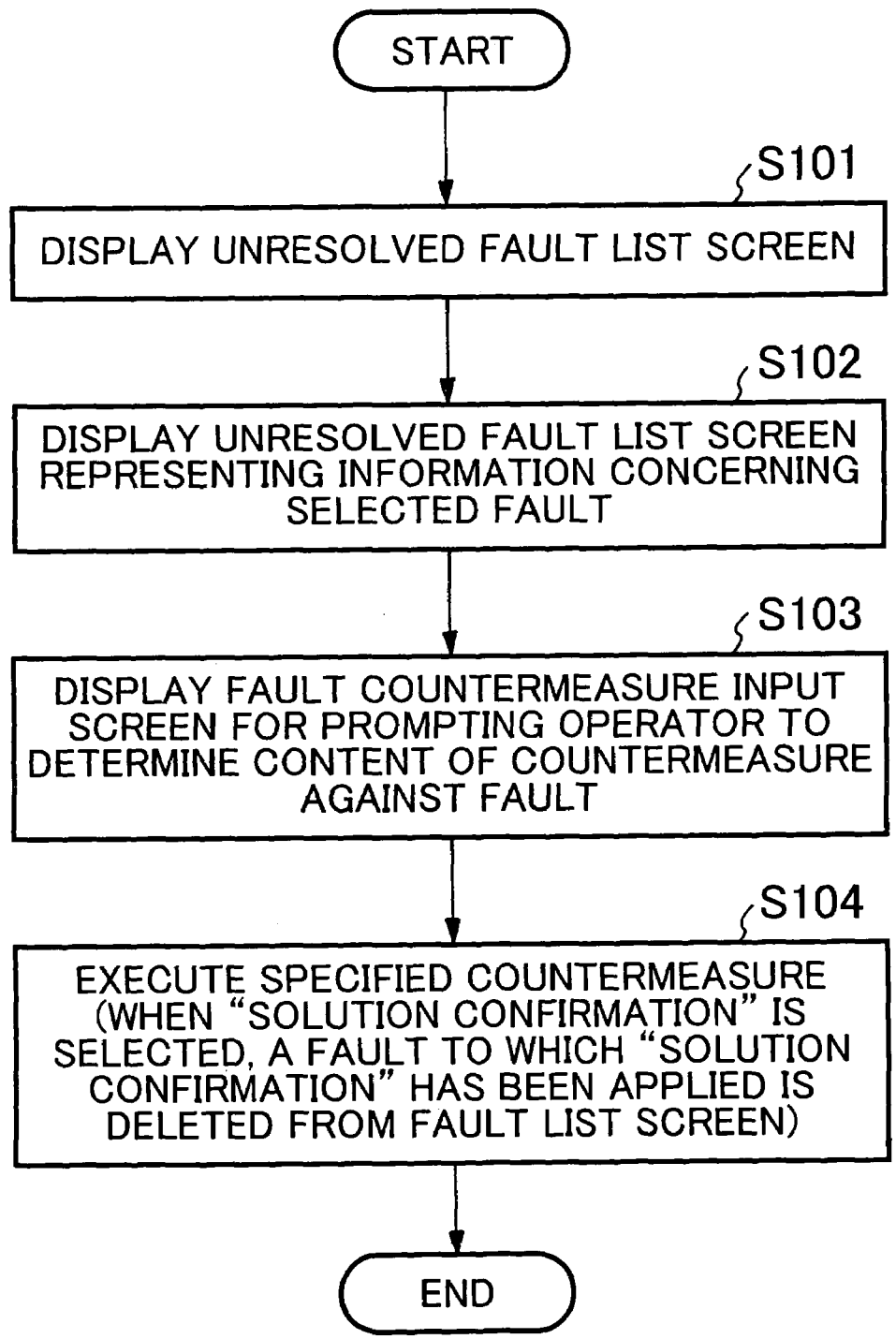
FIG. 4 is a flowchart showing an example of management supporting operation performed by a management supporting system.

FIG. 4 is a flowchart showing an example of management supporting operation performed by the management supporting system. The autonomous collaborative work screen drawing section 7 generates an unresolved fault list screen presenting a list of unresolved faults occurring in the system to be managed and displays the unresolved fault list screen on the input/output device 1 (step S101). In step S101, for example, the autonomous collaborative work operation control section 6 extracts, from the autonomous collaborative work logs (see FIG. 3), information corresponding to the log IDs in which "Result" is not "Finished" and outputs the information to the autonomous collaborative work screen drawing section 7. Based on the received information, the autonomous collaborative work screen drawing section 7 generates the unresolved fault list screen. A description in the log ID in which "Result" is "Finished" means that "Solution confirmation" has been completed. Thus, it is only necessary to extract the information corresponding to the log IDs in which "Result" is not "Finished" in order to generate the unresolved fault list screen.

FIG. 5 is an explanatory view showing an example of the unresolved fault list screen. As shown in FIG. 5, the autonomous collaborative work screen drawing section 7 displays, e.g., "condition" (fault), "Location of occurrence" (location at which the fault has occurred), "Action" (action corresponding to the condition), "Date of occurrence" (date on which the condition has occurred), "Progress of countermeasure", and the like in association with one another. In the example of FIG. 5, information of an operator is included in "Progress of countermeasure". Assume that operator opeA who enters into the fault countermeasure work activates the input/output device 1 to allow the autonomous collaborative work screen drawing section 7 to display the unresolved fault list screen shown in FIG. 5 on the input/output device 1. Then, the operator opeA refers to an unresolved fault list screen 1101 to thereby grasp that three unresolved faults remain in the system to be managed, as well as information concerning the countermeasures of the respective faults.

The fault information shown in the first line of FIG. 5 represents that the autonomous system has applied an action actionC1 to fault EventA1 which, however, has resulted in failure. The fault information shown in the second line of FIG. 5 represents that the autonomous system has applied action actionB2 to fault EventB2, which has resulted in success. From the information shown in the second line, the operator can grasp what he or she has to do, i.e., to confirm whether the fault in the system to be managed for which "success" has been determined has actually been eliminated and to input information indicating "Solution confirmation" has been made if the fault has actually been eliminated. The fault information shown in the third line of FIG. 5 represents that another operator opeB is now performing countermeasure operation for fault EventD1.

When one fault information is selected by a focus 1102 in the list of the fault information displayed on the unresolved fault list screen and a "reference" button is depressed (mouse click, etc.), the input/output devices 1 outputs the corresponding operation information to the autonomous collaborative work screen drawing section 7. The autonomous collaborative work screen drawing section 7 outputs the operation information to the autonomous collaborative work operation control section 6. The autonomous collaborative work operation control section 6 reads out information concerning the selected fault from the autonomous collaborative work log storage section 5 according to the operation information input from the autonomous collaborative work screen drawing section 7 and outputs the read out information to the autonomous collaborative work screen drawing section 7. Based on the information input from the autonomous collaborative work operation control section 6, the autonomous collaborative work screen drawing section 7 creates an unresolved fault information screen containing the information concerning the selected fault and displays it on the input/output devices 1 (step S102).

Figure 6:
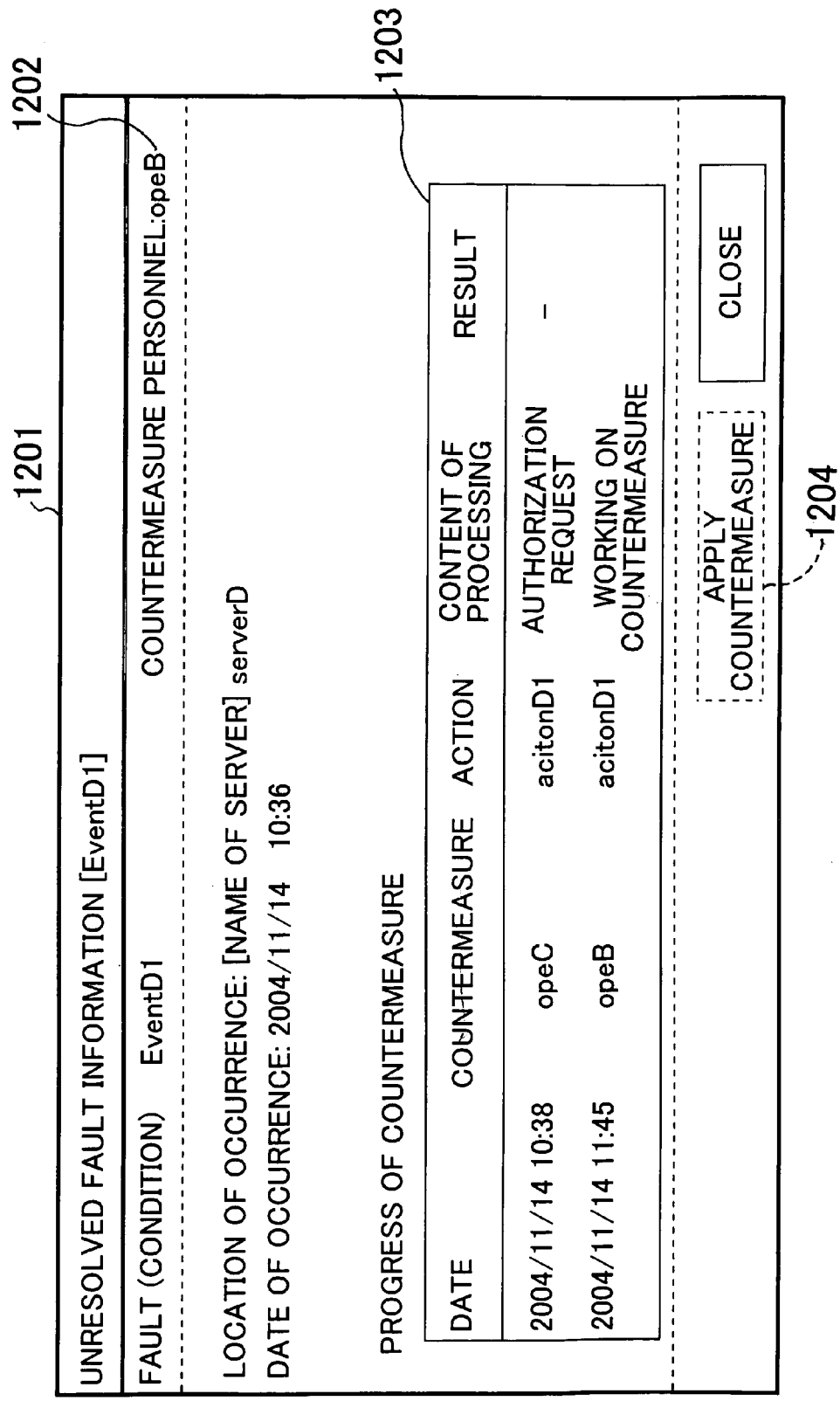
FIG. 6 is an explanatory view showing an example of an unresolved fault information screen.
Figure 7:
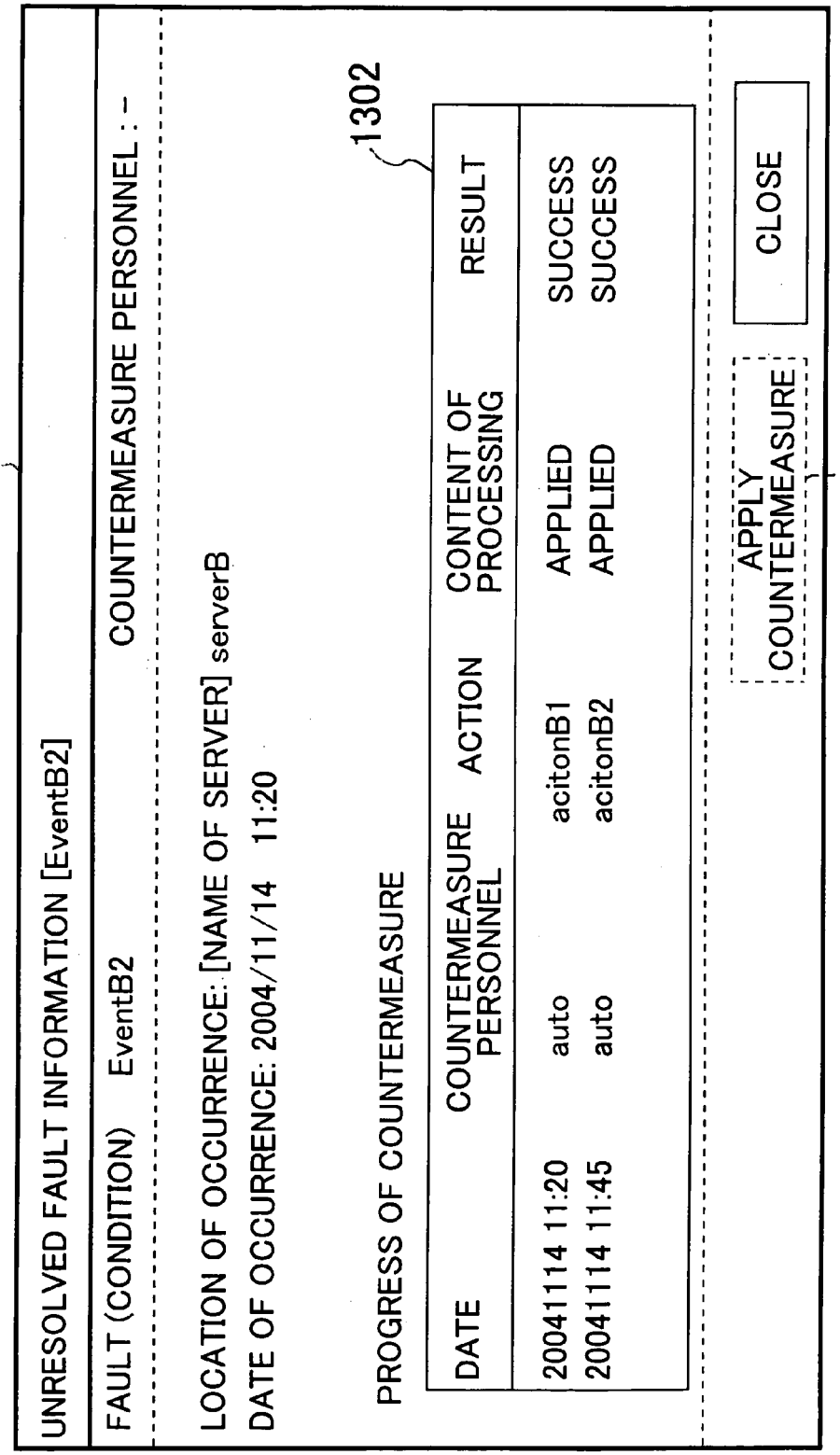
FIG. 7 is an explanatory view showing an example of an unresolved fault information screen.
Figure 8:
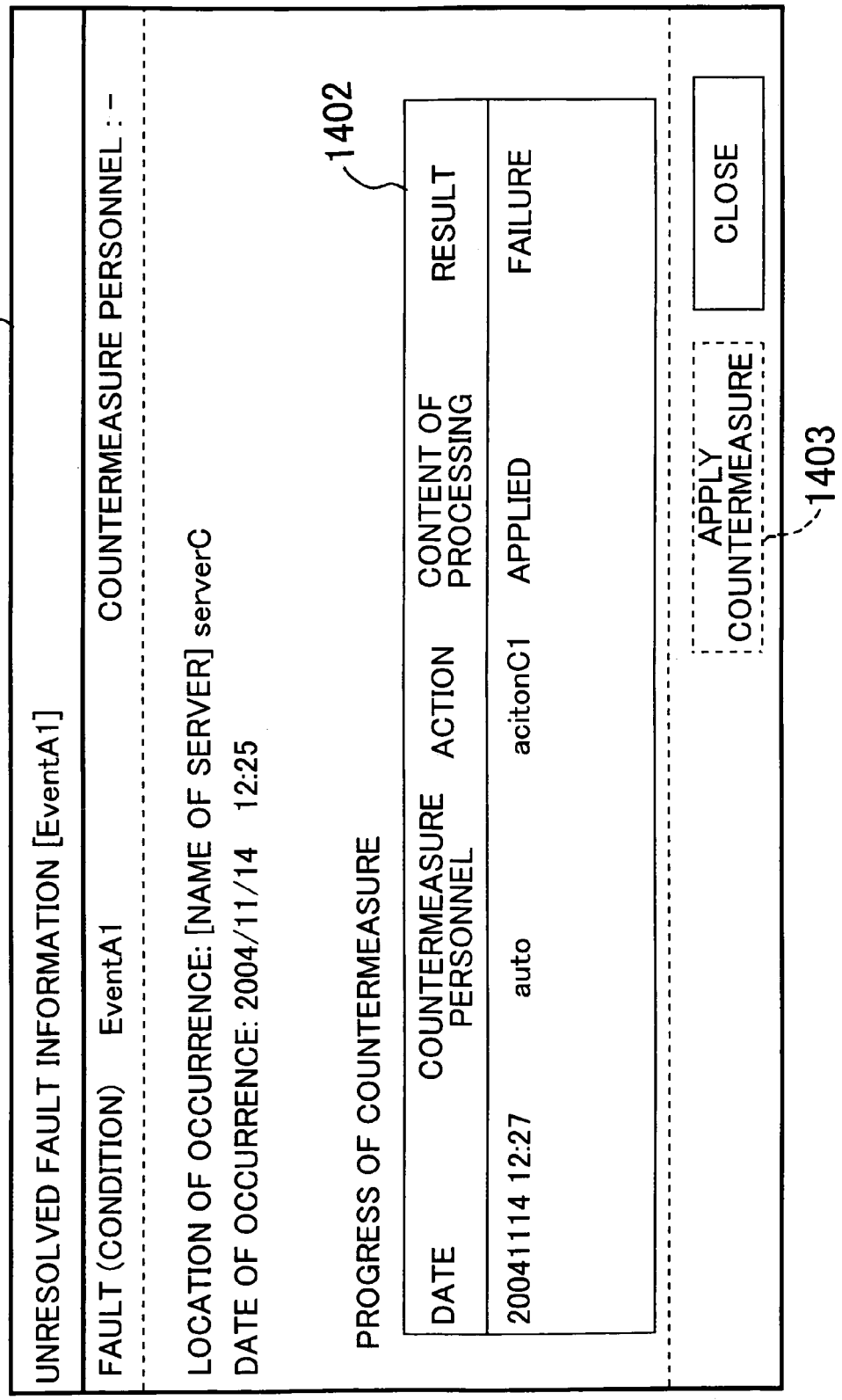
FIG. 8 is an explanatory view showing an example of an unresolved fault information screen.

FIGS. 6 to 8 each show an example of an unresolved fault information screen. FIG. 6 shows an unresolved fault information screen generated in the case where fault EventD1 has been selected on the unresolved fault list screen shown in FIG. 5. An unresolved fault information screen 1201 of FIG. 6, which displays information concerning the fault EventD1, presents an item 1202 (containing "Location of occurrence", "Date of occurrence", current countermeasure personnel, etc.) which can be confirmed on an unresolved fault information list screen 1101 (see FIG. 5), as well as a countermeasure progress list 1203. The countermeasure progress list 1203 presents, e.g., date, countermeasure personnel, action, content of processing, and result. "Content of processing" includes the content of a countermeasure such as "Authorization request", information representing that a given operator is now working on a countermeasure, and the like. The countermeasure progress list 1203 of FIG. 6 represents that operator opeC has inputted an action and made an authorization request and that operator opeB is now working on a countermeasure (confirming the action input by the operator opeC).

A "Countermeasure" button displayed on the unresolved fault list screen is a button for the operator to instruct a transition to a fault countermeasure input screen (see FIG. 9) for the operator to input the content ("Apply", "Authorization request", "Authorization reject" "Solution confirmation") of a countermeasure. However, the management supporting system according to the present invention inhibits a plurality of workers from simultaneously entering into the countermeasure operation for one fault. Specifically, in the case where a given operator performs countermeasure operation while referring to a fault countermeasure input screen (see FIG. 9) corresponding to a given fault, the autonomous collaborative work screen drawing section 7 displays the unresolved fault information screen concerning the fault in such a mode that the "Countermeasure" button cannot be depressed. The operator opeB is now working on a countermeasure against the fault EventD1 in the example of FIG. 6. Thus, when generating the unresolved fault information screen concerning the fault EventD1 according to the operation of the operator opeA, the autonomous collaborative work screen drawing section 7 generates the unresolved fault information screen in such a mode that the "Countermeasure" button cannot be depressed. As a result, a fault countermeasure input screen concerning one fault is not viewed simultaneously by a plurality of operators. It should be noted that an unresolved fault list screen concerning one fault can be viewed simultaneously by a plurality of operators.

In order to identify an operator who operates the input/output device 1, it is only necessary for the management supporting system to display a login screen at the system start-up time (for example, at the start-up time of each of the input/output devices 1, which is a part of the system) so as to perform user authentication followed by transition to step S101.

FIG. 7 shows an unresolved fault information screen generated in the case where fault EventB2 has been selected on the unresolved fault list screen shown in FIG. 5. An unresolved fault information screen 1301 of FIG. 7, which displays information concerning fault EventB2, contains a countermeasure progress list 1302 similar to the countermeasure progress list 1203. The countermeasure progress list 1301 of FIG. 7 represents that the autonomous system has applied action actionB1 and action actionB2 in succession, which has resulted in success, and no countermeasure personnel is now working on the countermeasure against fault EventB2. Since no countermeasure personnel is now working on the countermeasure against fault EventB2 in the example of FIG. 7, the autonomous collaborative work screen drawing section 7 generates the unresolved fault information screen in such a mode that a "Countermeasure" button 1303 can be depressed.

FIG. 8 shows an unresolved fault information screen generated in the case where fault EventA1 has been selected on the unresolved fault list screen shown in FIG. 5. An unresolved fault information screen 1401 of FIG. 8, which displays information concerning fault EventA1, contains a countermeasure progress list 1402 similar to the countermeasure progress lists 1203 and 1302. The countermeasure progress list 1402 of FIG. 8 represents that the autonomous system has applied action actionC1, which has resulted in failure, and no countermeasure personnel is now working on the countermeasure against fault EventA1. Since no worker is now working on the countermeasure against fault EventA1 in the example of FIG. 8, the autonomous collaborative work screen drawing section 7 generates the unresolved fault information screen in such a mode that a "Countermeasure" button 1403 can be depressed.

When the "Countermeasure" button is depressed, the input/output device 1 outputs operation information corresponding to the depression operation to the autonomous collaborative work screen drawing section 7, and then the autonomous collaborative work screen drawing section 7 outputs the operation information to the autonomous collaborative work operation control section 6. Based on the operation information, the autonomous collaborative work operation control section 6 instructs the autonomous collaborative work screen drawing section 7 to generate a fault countermeasure input screen. Then, the autonomous collaborative work screen drawing section 7 generates the fault countermeasure input screen and displays it on the input/output device 1. The fault countermeasure input screen is a screen for prompting the operator to determine the content ("Apply", "Authorization request", "Authorization reject" "Solution confirmation") of a countermeasure.

In this example, it is assumed that the unresolved fault information screen 1401 of FIG. 8 is displayed in step S102, and operator opeA depresses the "Countermeasure" button 1403 in the unresolved fault information screen 1401 so as to take over the countermeasure operation against fault EventA1, for which the countermeasure operation taken by the autonomous system has resulted in failure.

Figure 9:
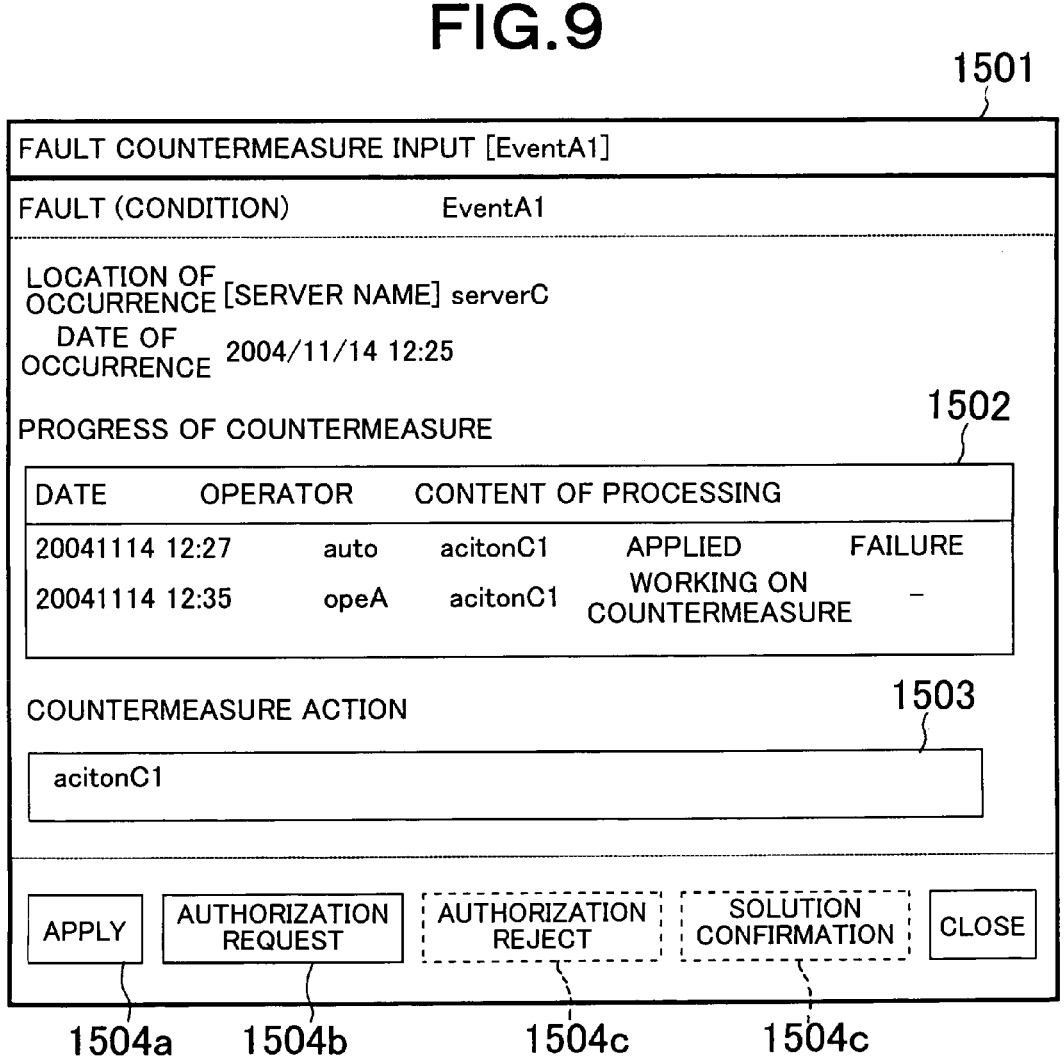
FIG. 9 is an explanatory view showing an example of a fault countermeasure input screen.

When the "Countermeasure" button 1403 (FIG. 8) is depressed by operator opeA, the autonomous collaborative work screen drawing section 7 displays the fault countermeasure input screen (step S103). FIG. 9 is an explanatory view showing an example of the fault countermeasure input screen displayed in step S103. A fault countermeasure input screen 1501 of FIG. 9 is used for determining the content of a countermeasure against fault EventA1. The autonomous collaborative work screen drawing section 7 generates the fault countermeasure input screen so as to present fault (condition) occurring in the system to be managed, location of occurrence, and date of occurrence. The fault countermeasure input screen 1501 contains a countermeasure progress list 1502 similar to the countermeasure progress lists 1203, 1302, and 1402 shown in FIGS. 6 to 8. The countermeasure progress list 1502 of FIG. 9 represents that the autonomous system has applied action actionC1 which has resulted in failure, and operator opeA is now working on a countermeasure operation against fault EventA1. As described above, in order to identify a current operator as operator opeA, it is only necessary to display a login screen at the start-up time of e.g., the input/output device 1 so as to perform user authentication.

Further, the autonomous collaborative work screen drawing section 7 generates the fault countermeasure input screen so as to include buttons 1504a to 1504d for determining, as the content of a countermeasure, one of "Apply", "Authorization request", "Authorization reject", and "Solution confirmation". However, since action actionC1 executed by the autonomous system has failed in the example of FIG. 9, the autonomous collaborative work screen drawing section 7 generates the fault countermeasure input screen in such a mode that the "Solution confirmation" button 1504 cannot be depressed so as to prevent the "Solution confirmation" button 1504 from being selected. Similarly, the immediately preceding content of the countermeasure is not "Authorization request", that is, it is not necessary to select "Authorization reject", so that "Authorization reject" button 1504c cannot be depressed here.

Further, the autonomous collaborative work screen drawing section 7 contains a countermeasure action input area 1503 for the operator to specify an action to be executed. In the countermeasure action input area 1503 of FIG. 9, an action (actionC1, in this example) most recently applied to the system to be managed is displayed in a default state.

In step S103, the autonomous collaborative work screen drawing section 7 displays the fault countermeasure input screen, which prompts operator opeA to determine the content of a countermeasure. At this time, there may be a case where operator opeA is prompted to specify an action. When the content of a countermeasure is determined on the fault countermeasure input screen, the input/output device 1 outputs operation information representing the operator's determination operation of the countermeasure to the autonomous collaborative work screen drawing section 7, and the autonomous collaborative work screen drawing section 7 outputs the operation information to the autonomous collaborative work operation control section 6. The autonomous collaborative work operation control section 6 executes processing according to the received operation information and, at the same time, stores a corresponding autonomous collaborative work log in the autonomous collaborative work log storage section 5 (step S104). When "Solution confirmation" is determined as the countermeasure, the autonomous collaborative work operation control section 6 instructs the autonomous collaborative work screen drawing section 7 to delete a fault to which "Solution confirmation" has been applied from the unresolved fault confirmation list screen.

In this example, operator opeA examines a more adequate countermeasure than action actionC1 and specifies it by editing the countermeasure action input area 1503 since another application of the action actionC1 displayed in the countermeasure action input area 1503 is likely to result in failure. Here, it is assumed that operator opeA inputs action actionC2 in the countermeasure action input area 1503 to specify action actionC2 and that operator opeA depresses the "Apply" button 1504*a* to instruct the application of action actionC2 to the system to be managed. The input/output device 1 outputs operation information according to the above operation to the autonomous collaborative work screen drawing section 7, and the autonomous collaborative work screen drawing section 7 outputs the operation information to the autonomous collaborative work operation control section 6. The autonomous collaborative work operation control section 6 executes (applies) action actionC2 for the system to be managed according to the operation information input from the autonomous collaborative work screen drawing section 7. Further, the autonomous collaborative work operation control section 6 stores this operation and application result of action actionC2 as the autonomous collaborative work log (step S104). With that, the countermeasure operation for fault EventA1 is once finished.

When the "Close" button is depressed in the screen shown in FIG. 6, FIG. 7, FIG. 8, or FIG. 9, the input/output device 1 closes the corresponding screen.

When operation instructing the display of unresolved fault list screen is performed once again on the input/output device 1, the management supporting system displays the unresolved fault list screen in the same manner as step S101 (step S101).

FIG. 10 is an explanatory view showing an example of the unresolved fault list screen which has been regenerated after the above operation. Information of a fault shown in the first line in the regenerated unresolved fault list information screen 1601 of FIG. 10 represents that operator opeA has applied action actionC2 to fault EventA1 and the processing has succeeded. Thus, operator opeA can grasp that the countermeasure performed by him or herself has succeeded. Information of a fault shown in the second line of FIG. 10 is the same as the fault information shown in the second line of FIG. 5. From this, operator opeA can grasp that there has been no change in the progress of the countermeasure for fault EventB2 from the time point at which operator opeA started to work on the countermeasure operation for fault EventA1. Further, it can be seen from a comparison between the unresolved fault list screen shown in FIG. 5 and regenerated unresolved fault list screen shown in FIG. 10 that the information of fault EventD1 has been deleted from the unresolved fault list screen of FIG. 10. Thus, it is possible to grasp that fault EventD1 has been resolved by an operator (in this case, perhaps operator opeB) other than operator opeA.

The steps subsequent to step S101 may be repeated according to the operator's operation after the regeneration of the unresolved fault list screen. For example, when fault EventA1 is selected by operator opeA on the unresolved fault list screen shown in FIG. 10, the management supporting system (more specifically, the autonomous collaborative work screen drawing section 7 and autonomous collaborative work operation control section 6) displays the unresolved fault information screen presenting information of fault EventA1 on the input/output device 1 (step S102). Further, when the "countermeasure" button on the unresolved fault information screen is depressed by operator opeA, the management supporting system displays the fault countermeasure input screen (step S103). Further, when the "Solution confirmation" button on the fault countermeasure input screen is depressed, which means that fault EventA1 has been resolved, the autonomous collaborative work operation control section 6 deletes the information concerning fault EventA1 from the unresolved fault list screen 1601 of FIG. 10 (step S104).

In the case where the unresolved fault list screen presents the success of the execution result of an action applied, the operator examines the state of the system to be managed by him or herself, confirms that there is actually no fault in the system to be managed, and depresses the "Solution confirmation" button. That is, the final determination of presence/absence of a fault in the system to be managed is made by an operator (human). Accordingly, even if the execution result of an action is success, the state of a fault to which the action has been applied remains unresolved until someone who works on the countermeasure operation performs the final solution confirmation.

However, as has been described above, in the case where it is empirically known that there is a high possibility that the problem has been resolved when the application result of a specified action is success, the autonomous system may perform the solution confirmation. In the case where all the steps from the fault countermeasure to solution confirmation are automatically executed, it is only necessary to include the action of "Solution confirmation" in the description of the autonomous rule. In this case, the following procedure may be performed: an action described ahead of the "Solution confirmation" in the autonomous rule is executed first to change the state of the system to be managed into a predetermined state; and in the case where it is determined that the execution result of the action is success, the autonomous collaborative work operation control section 6 determines that there is no fault in the system to be managed and adds a log as shown in the second line (second line of log ID "L0001") of FIG. 3. In this case, it is not necessary to display "Success [auto]" in the column of "Progress of countermeasure" and prompt the operator to perform "Solution confirmation" as shown in the second line of FIG. 5. It should be noted that allowing the autonomous system to perform the solution confirmation must be limited to a case where it is empirically known that there is a high possibility that the problem has been resolved when the application result of a specified action is success, and that it is preferable that not the autonomous system but a human finally perform the "Solution confirmation" in principle.

According to the management supporting system of the first exemplary embodiment, there are provided screens (screens shown in FIGS. 5 to 9) allowing the operator to refer to the operation of the autonomous system and operation performed by a plurality of operators working on the countermeasure operation, which are integrated in the same format, in a work flow which is partly automated by the introduction of the autonomous system. With this configuration, an operator working on the countermeasure operation can grasp and take over the progress of the countermeasure operation performed not only by another operator but also by the autonomous system, and thus it can be expected to cast aside operator's distrust of the autonomous system. Further, even in the case where the operation of the autonomous system is stopped due to insufficiency or occurrence of an error in the autonomous rules, it is possible for the operator to immediately and smoothly take over the countermeasure operation.

The autonomous rule storage section 4 and autonomous collaborative work log storage section 5 are each realized by, e.g., a storage apparatus. The input/output device 1 is realized by, e.g., a terminal apparatus (personal computer, etc.) provided with a display unit and an input device (keyboard or mouse). The system state monitoring section 2, countermeasure determination section 3, autonomous collaborative work operation control section 6, and autonomous collaborative work screen drawing section 7 may each be realized by a hardware having a corresponding function. Alternatively, the system state monitoring section 2, countermeasure determination section 3, autonomous collaborative work operation control section 6, and autonomous collaborative work screen drawing section 7 may be realized by a computer which operates according to a program. In this case, for example, the system state monitoring section 2, countermeasure determination section 3, autonomous collaborative work operation control section 6 and autonomous collaborative work screen drawing section 7 may be realized when a program is stored in a program storage medium and a computer operates according to the stored program.

The autonomous rule storage section 4, autonomous collaborative work log storage section 5, system state monitoring section 2, countermeasure determination section 3, autonomous collaborative work operation control section 6, and autonomous collaborative work screen drawing section 7 may be realized separately or in combination. For example, the system state monitoring section 2, countermeasure determination section 3, and autonomous rule storage section 4 may be realized as one apparatus, and autonomous collaborative work operation control section 6, autonomous collaborative work screen drawing section 7, and autonomous collaborative work log storage section 5 may be realized as another one.

Second Exemplary Embodiment

Figure 11:
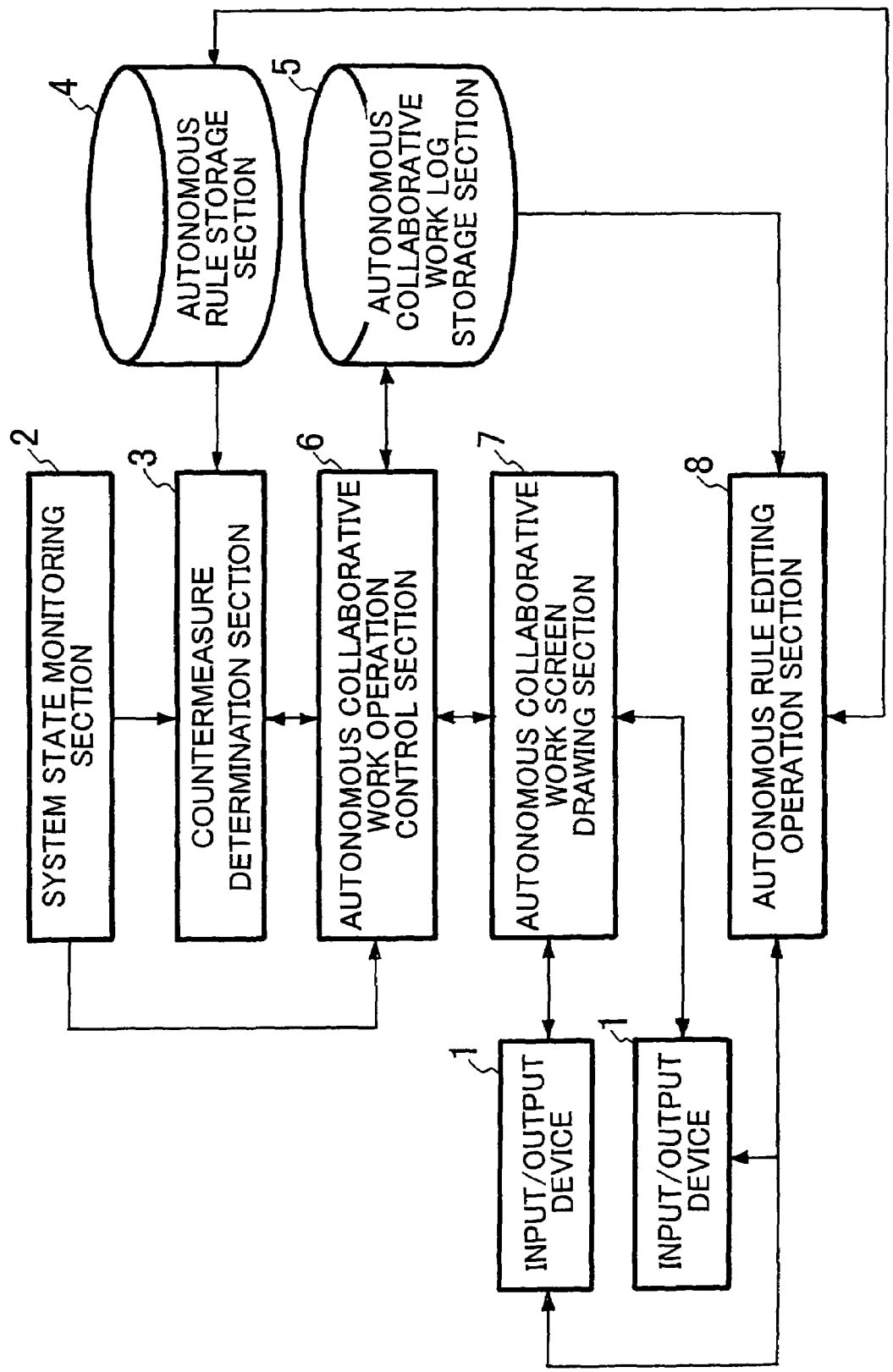
FIG. 11 is a block diagram showing a second exemplary embodiment of the present invention.

FIG. 11 is a block diagram showing a second exemplary embodiment of the present invention. In FIG. 11, the same reference numerals as those in FIG. 1 denote the same components as those in FIG. 1, and the descriptions thereof will be omitted here. A management supporting system according to the second exemplary embodiment includes an autonomous rule editing operation section 8 in addition to the components of the first exemplary embodiment.

The autonomous rule editing operation section 8 especially plays an important role in the present exemplary embodiment in addition to the components of the first exemplary embodiment. In the management supporting system according to the present exemplary embodiment, the autonomous rule editing operation section 8 generates an autonomous-collaboration history screen (series of screens shown in FIGS. 13 to 17) by which the operator can refer to the content of autonomous collaborative work logs stored in the autonomous collaborative work log storage section 5. The autonomous rule editing operation section 8 generates the autonomous-collaboration history screen as a screen that displays the previous operation state of the autonomous system and previous working state of a human in the same format. Through the autonomous-collaboration history screen generated by the autonomous rule editing operation section 8, the operator can refer to the operational history (for example, a countermeasure history list 2202 to be described later) of the autonomous system conforming to autonomous rules currently stored in the autonomous rule storage section 4 and events (for example, a similar event list 2203 to be described later) that the autonomous system has failed to resolve due to insufficiency or occurrence of an error in the description of the autonomous rules and therefore a human has treated.

Further, in the present exemplary embodiment, the autonomous rule editing operation section 8 generates an autonomous rule edit screen (screens shown in FIGS. 15 to 17) which allows the operator to refer to and edit autonomous rules stored in the autonomous rule storage section 4. The autonomous rule editing operation section 8 is configured to receive, as an input, operation information representing the content of the operator's operation for the input/output device 1. Upon receiving the operation information, the autonomous rule editing operation section 8 displays an autonomous edit screen for editing an autonomous rule on the input/output device 1 according to the operation information based on data (autonomous collaborative work log and autonomous rule) stored in the autonomous collaborative work log storage section 5 and autonomous rule storage section 4.

An operator having authority refers to the autonomous collaborative work logs of the previous operation performed by the autonomous system and human operator using the input/output device 1 and edits autonomous rules to thereby grasp insufficiency or an error in the description of the autonomous rules and newly create autonomous rules with reference to cases of the operation performed by a human. At this time, the input/out device 1 outputs operation information representing autonomous rule creation operation by a human to the autonomous rule editing operation section 8, and the autonomous rule editing operation section 8 deletes an erroneous autonomous rule stored in the autonomous rule storage section 4 or stores a new autonomous rule created according to the operator's operation in the autonomous rule storage section 4.

Figure 12:
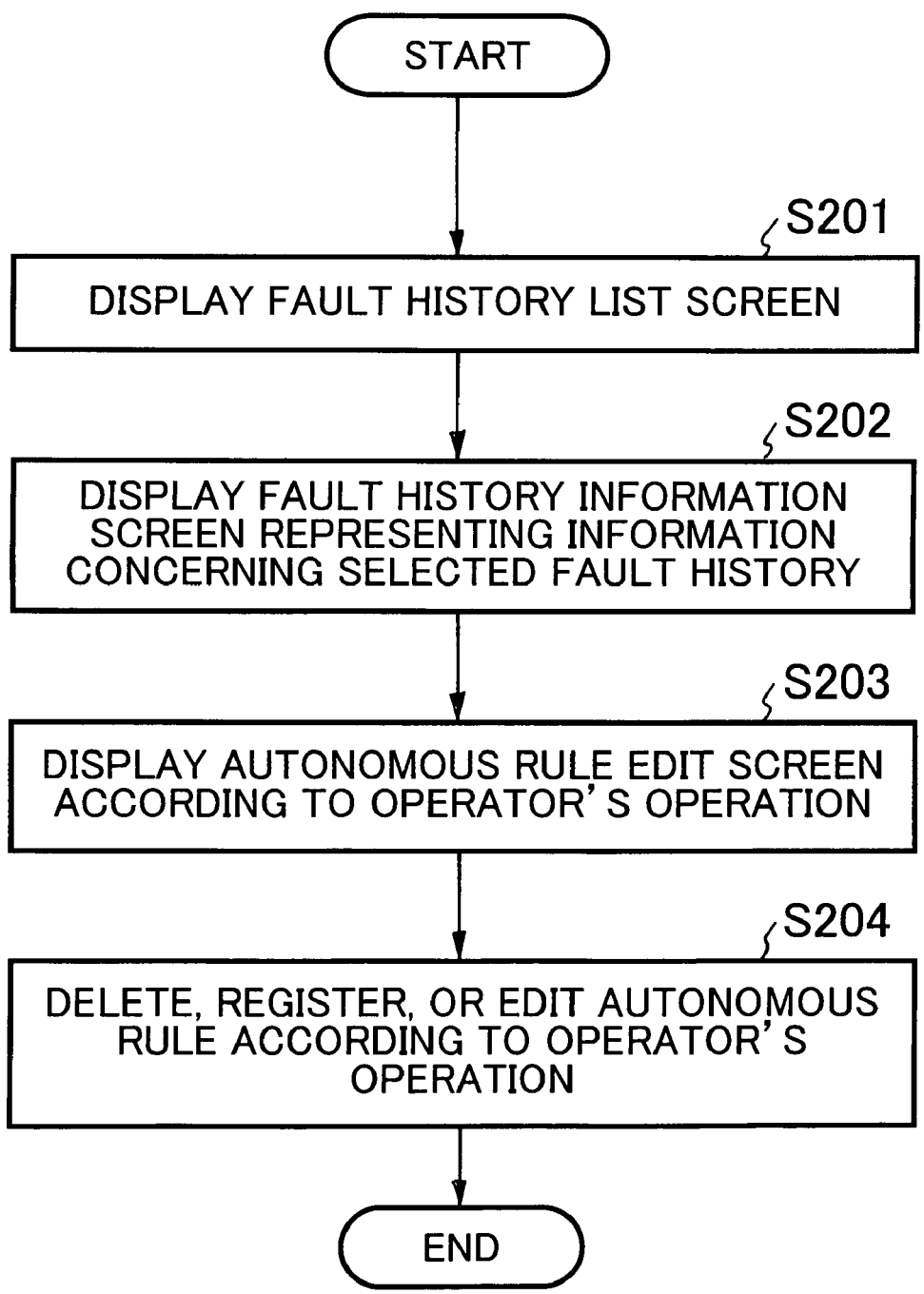
FIG. 12 is a flowchart showing an example of autonomous rule edit supporting operation performed by a management supporting system.

Next, with fault countermeasure operation for a fault that has occurred in the system to be managed taken as an example of the autonomous collaborative work, management supporting operation (autonomous rule edit supporting operation) performed by the management supporting system will be described. In addition, an example of a screen that the autonomous rule editing operation section 8 generates will be described. FIG. 12 is a flowchart showing an example of the autonomous rule edit supporting operation performed by the management supporting system.

It is assumed here that operator adminA having authority to edit the autonomous rule refers to and analyzes the history of the fault countermeasure operation performed by operator opeA which has been exemplified in the first exemplary embodiment. In order to determine whether an operator who is now operating the input/output device 1 has authority to edit the autonomous rule, it is only necessary for the management supporting system to perform user authentication as in the case of the first exemplary embodiment.

Figure 13:
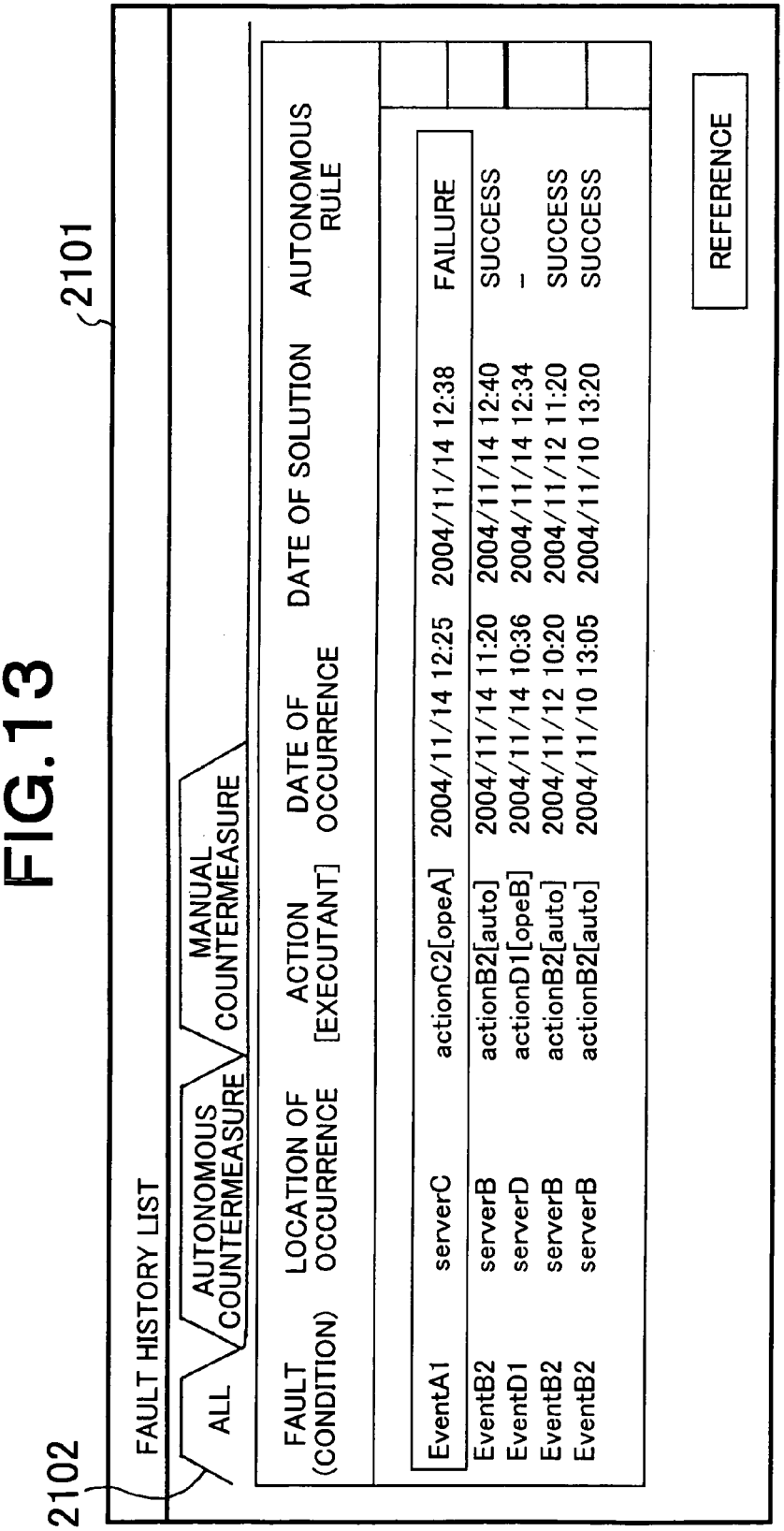
FIG. 13 is an explanatory view showing an example of a fault history list screen.

The autonomous rule editing operation section 8 generates a fault history list screen presenting the list of faults that have previously occurred in the system to be managed and already been resolved and displays the fault history list screen on the input/output device 1 (step S201). FIG. 13 is an explanatory view showing an example of the fault history list screen. The fault history list screen 2101 shown in FIG. 13 contains, as fault history list screen, "Fault (condition)", "Location of occurrence" of the fault, "Date of occurrence" of the fault, "Date of solution" of the fault, "Most recently executed action", "Name of executant", as well as "autonomous rule" (information notifying whether the autonomous rule has been applied or not and its result, if applied). After extracting, from the autonomous collaborative work logs (FIG. 3) stored in the autonomous collaborative work log storage section 5, information corresponding to the log IDs in which "Result" is "Finished" is extracted, and the autonomous rule editing operation section 8 can generate the fault history list screen based on the extracted information. As has been described in the first exemplary embodiment, a description in the log ID in which "Result" is "Finished" means that "Solution conformation" has been completed. Thus, it is possible to create the fault history list screen presenting the list of faults that have previously occurred and already been resolved based on the information corresponding to the log IDs in which "Result" is "Finished".

The operator can grasp information presented on the screen by referring to the fault history list screen shown in FIG. 13. Note that "--" displayed in the column of "Autonomous rule"

in the example of FIG. 13 means that the autonomous rule has not been applied. "Success" displayed in the column of "Autonomous rule" means that the autonomous rule has been applied and obtained result is "success". "Fault" displayed in the column of "Autonomous rule" means that the autonomous rule has been applied and obtained result is "Failure".

Information of the fault history shown in the first line of FIG. 13 represents that operator opeA has successfully applied to fault EventA1, while application of the autonomous rule has resulted in failure. Information of the fault history shown in the second, fourth, and fifth lines in FIG. 13 show information concerning the same fault. From the information shown in the second, fourth, and fifth lines, the operator can grasp that fault EventB2 has frequently occurred in the same location (serverB).

Three tags 2102 are displayed on the fault history list screen of FIG. 13. The autonomous rule editing operation section 8 displays on the input/output device 1 a fault history list screen showing the entire list or fault history list screen partly showing the list in accordance with the tag mouse-clicked by the operator. The fault history list screen in FIG. 13 is one showing the entire list. When an "Autonomous countermeasure" tag is mouse-clicked, the autonomous rule editing operation section 8 extracts the fault history information to which the autonomous system has successfully applied a countermeasure from the fault history information concerning the information that have previously occurred and already been resolved so as to display the extracted fault history information within the fault history list screen. When an "manual countermeasure" tag is mouse-clicked, the autonomous rule editing operation section 8 displays within the fault history list screen only the fault history information to which a countermeasure is applied not by the autonomous system but by a human.

When one fault history in the list displayed within the fault history list screen is selected by a cursor and a "Reference" button is depressed (mouse-clicked), the input/output device 1 outputs corresponding operation information to the autonomous rule editing operation section 8. The autonomous rule editing operation section 8 reads out information concerning the selected fault history from the autonomous collaborative work log storage section 5 according to the operation information and creates a fault history information screen presenting detailed information concerning the selected fault history. The autonomous rule editing operation section 8 then displays the created fault history information screen on the input/output device 1 (step S202). The operator refers to detailed information concerning the selected fault history by representing the fault history information screen.

FIG. 14 is an explanatory view of an example of the fault history information screen. FIG. 14 shows a fault history information screen displayed in the case where the history of fault EventA1 is selected on the fault history list screen shown in FIG. 13. It is assumed in this example that identification information "EventA1_200411141225" is allocated to the history of fault EventA1 on the fault history list screen. The autonomous rule editing operation section 8 generates the fault history information screen containing items, such as "Fault" (Event A1), "Location of occurrence" (serverC), "Date of occurrence", "Date of solution" that can be referred to on the fault history list screen 2101, as well as identification information (EventA1_200411141225) of the fault history, countermeasure history list 2202, similar event list 2203, and "rule edit" button 2204.

The countermeasure history list 2202 presents more detailed countermeasure history information concerning the selected fault EventA1. More specifically, the countermeasure history list 2202 presents, e.g., "Date" of application of countermeasure, "Operator" (including autonomous system) executing countermeasure, "Action", "content of countermeasure", "Result" of execution of action (or a part of the above items) in units of countermeasures sequentially applied.

The similar event list 2203 presents one or more information concerning the fault history similar to the selected fault history. The autonomous rule editing operation section 8 may read out from the autonomous collaborative work log storage section 5 e.g., information ("Date of occurrence", "Date of solution", "Action", and "Executant") concerning a fault whose type and location of occurrence are the same as that of the selected fault history and includes the read out information in the fault history information screen as the similar event list 2203. Although the information concerning a fault whose type and location of occurrence are the same as the selected fault history is set as the similar event list 2203 in the above case, information ("Date of occurrence", "Date of solution", "Action", "Executant", and the like) only whose type is the same as the selected fault history may be read out from the autonomous collaborative work log storage section 5 and set as the similar event list 2203.

The countermeasure history list 2202 shown in FIG. 14 represents that the autonomous system has applied action actionC1 which, however, has resulted in failure, and then operator opeA has inputted (applied) action actionC2 to thereby resolve a fault. By referring to the countermeasure history list 2202, the operator (adminA) can grasp the history as described above.

The similar event list 2203 shown in FIG. 14 represents that the fault EventA1 has occurred three times at the same location (serverC) including the one (fault EventA1_200411141225) whose detailed information is currently displayed, and action actionC2 has been applied to all the three cases by operator opeA. By referring to the similar event list 2203, the operator (adminA) can grasp the content as described above.

Operator opeA referring to the fault history information screen 2201 shown in FIG. 14 can grasp that action actionC1 defined in the current autonomous rule as an action for fault EventA1 has not been effective, a human operator has taken over the countermeasure operation, and the operator has applied action actionC2 to thereby achieve solution. Based on the above understanding, operator opeA can determine to change the autonomous rule R0005 (see FIG. 2) which defines the action for fault EventA1. In changing the autonomous rule, operator adminA depresses the "rule edit" button 2204 to call an edit screen of the autonomous rule which defines the action for the fault (fault EventA1 occurring in serverC) that is being displayed on the fault history information screen. Upon depression of the "rule edit" button 2204 within the fault history information screen 2201, the input/output device 1 outputs corresponding operation information to the autonomous rule editing operation section 8. Then, the autonomous rule editing operation section generates an autonomous rule edit screen for editing the autonomous rule (in this example, the autonomous rule which defines the action for fault EventA1 occurring in serverC) which defines the action for the fault displayed in the fault history information screen and displays the generated autonomous rule edit screen on the input/output device 1.

FIGS. 15 to 17 are explanatory views each showing an example of the autonomous rule edit screen. FIG. 15 shows an autonomous rule edit screen used when fault EventA1 has occurred in serverC (i.e., autonomous rule edit screen displayed when the "rule edit" button 2204 shown in FIG. 14 is depressed). An autonomous rule edit screen 2301 shown in FIG. 15 contains "Condition" (i.e., fault EventA1) defined in the autonomous rule applied when fault EventA1 has occurred in serverC, "Location of occurrence" (i.e., serverC), and "Action" to be applied as a countermeasure. In addition, "Number of occurrences" of the fault is displayed. In the example of FIG. 15, the autonomous rule editing operation section 8 generates the autonomous rule edit screen in such a manner that "Condition", "Location of occurrence", and "Number of occurrences" are displayed in the upper portion of the screen. Further, the autonomous rule editing operation section 8 generates the autonomous rule edit screen in such a manner that a list of actions defined in the autonomous rule as an autonomous rule list 2302. In the autonomous rule list 2302, "Action", "Date of creation of rule" representing the date on which a rule to which the action is added, "Authorization" representing whether authorization is required or not, "Number of applications" representing the number of applications of the action, and "Number of successes" representing the number of successes of the application result are displayed. The autonomous rule list 2302 shown in FIG. 15 represents that the autonomous rule has applied action actionC1 three times at the time of occurrence of fault (EventA1), which, however, has never succeed till now.

Further, the autonomous rule editing operation section 8 generates the autonomous rule edit screen in such a manner that a list of actions that are not described in the stored autonomous rule but have previously been applied by a human operator at the time of occurrence of a fault (condition described in the autonomous rule to be edited) is displayed as a countermeasure action list 2303. The countermeasure action list 2303 contains, e.g., "Action", "Date of application" of the action, "Executant" of the action, and "Result" of the action. The countermeasure action list shown in FIG. 15 represents that action actionC2 has previously been applied by the same operator (operator opeA) three times, and the results of all the three applications are success.

Upon display of the autonomous rule edit screen, the autonomous rule editing operation section 8 deletes the autonomous rule stored in the autonomous rule storage section 4 or stores a new autonomous rule in the autonomous rule storage section 4 according to the operator's operation for the input/output device 1 (step S204). In step S204, the autonomous rule editing operation section 8 may add a new action to the existing autonomous rule according to the operator's operation. When the autonomous rule list 2302 is selected and a "Delete" button is depressed, the autonomous rule editing operation section 8 deletes action or condition presented as an autonomous rule on the autonomous rule edit screen from the autonomous rule storage section 4. Further, when the action is selected on the countermeasure action list 2303 and a "Registration" button is depressed, the autonomous rule editing operation section 8 creates a new autonomous rule including the selected action and stores the created autonomous rule in the autonomous rule storage section 4. At this time, in the autonomous rule newly created, the operator can describe the content of items other than "Action" (i.e., "Condition", "Server", "Authorization") in line with the contents displayed on the autonomous rule edit screen 2301.

For example, it is assumed that operator adminA selects action actionC1 in the autonomous rule list 2302 and depresses the "Delete" button. Then, the autonomous rule editing operation section 8 once deletes the autonomous rule which defines action actionC1 for fault EventA1 occurring in serverC. Further, it is assumed that operator adminA selects adequate action (action actionC2) in the countermeasure action list 2303 and depresses the "Registration" button.

Then, the autonomous rule editing operation section 8 registers the autonomous rule which defines action actionC2 for fault EventA1 occurring in serverC in the autonomous rule storage section 4. As a result, when the similar fault has occurred afterward, the autonomous system automatically executes action actionC2 according to the updated autonomous rule.

FIG. 16 shows an autonomous rule edit screen used when fault EventB2 has occurred in serverB. An autonomous rule edit screen 2401 shown in FIG. 16 contains an autonomous rule list 2402 similar to the autonomous rule list 2302 shown in FIG. 15. The autonomous rule list 2402 shown in FIG. 16 represents that action actionA1 and action actionA2 have sequentially been executed at the time of occurrence of fault EventB2 and results of all the eleven previous applications are success. Further, the autonomous rule edit screen 2401 shown in FIG. 16 contains a countermeasure action list 2403 similar to the countermeasure action list 2303 shown in FIG. 15. However, the countermeasure list 2403 of FIG. 16 is vacant, so that the operator can grasp that the case that fault EventB2 occurs in server serverB does not bother a human operator.

When a "Create" button is depressed on the autonomous rule edit screen, the autonomous rule editing operation section 8 displays a screen (not shown) for inputting an action to be added to the autonomous rule on the input/output device 1. When a new action is input on the screen, the autonomous rule editing operation section 8 adds the action to the autonomous rule. Further, when an "Edit" button is depressed on the autonomous rule edit screen, the autonomous rule editing operation section 8 displays, on the input/output device 1, a screen (not shown) which displays the autonomous rule so as to allow the operator to rewrite the content of the autonomous rule. When the autonomous rule has been rewritten on the screen, the autonomous rule editing operation section 8 stores the rewritten autonomous rule in the autonomous rule storage section 4.

It is assumed that operator adminA refers to the autonomous rule edit screen 2401 shown in FIG. 15 and determines that the autonomous rule (autonomous rule R0003 shown in FIG. 2) to be applied when fault EventB2 has occurred in server serverB is extremely effective and reliable and therefore "Solution confirmation" can automatically be executed after application of the action defined in the autonomous rule has succeeded. In this case, operator adminA depresses the "Create" button to call a screen for adding the action and then adds the action of solution confirmation next to action actionA2 on the called screen. According to this operation, the autonomous rule editing operation section 8 edits the autonomous rule so as to add the action of solution confirmation next to action actionA2 in the autonomous rule R0003 shown in FIG. 2. FIG. 17 shows an autonomous rule edit screen (autonomous rule edit screen used when fault EventB2 has occurred in server serverB) regenerated after the above operation. When the autonomous rule edit screen is regenerated after the above operation, an autonomous rule list 2502 to which the action of solution confirmation has been added is displayed as shown in FIG. 17. From this screen, operator AdminA can confirm that the action of solution confirmation has been added. Further, as a result of the above operation, when the similar fault (EventB2 in serverB) has occurred afterward, the autonomous system automatically executes all the steps from application of a countermeasure action to solution confirmation.

According to the management supporting system of the second exemplary embodiment, there are provided screens (screens shown in FIGS. 13 to 17) allowing the operator to refer to the history of the operation of the autonomous system and history of the operation of a plurality of operators in a work flow which is partly automated by the introduction of the autonomous system. Thus, an operator having authority to edit the autonomous rule can utilize the history of the autonomous collaborative work, i.e., the content or success/failure of the operation performed by the operator (including the autonomous system) as a useful criterion to decide the necessity or content of the autonomous rule edit. For example, by referring to information representing whether the autonomous rule works effectively or not, whether manpower is excessively used due to insufficiency of the autonomous rule, or the like, the operator can determine the necessity of the autonomous rule edit. Further, the management supporting system can present countermeasures that have effectively been executed by a human operator to the operator. In this case, the operator can extract some countermeasures that can be included in the autonomous rule so as to create a new rule. As a result, adequate and speedy determination of the start time of the autonomous rule edit operation and realization of more reliable autonomous rule edit can be expected, thereby achieving an operation form in which the autonomous rule can be reinforced while the autonomous system is being operated.

In the present exemplary embodiment, as in the case of the first exemplary embodiment, the system state monitoring section 2, countermeasure determination section 3, autonomous collaborative work operation control section 6, autonomous collaborative work screen drawing section 7, and autonomous rule editing operation section 8 may each be realized by a hardware having a corresponding function. Alternatively, the system state monitoring section 2, countermeasure determination section 3, autonomous collaborative work operation control section 6, autonomous collaborative work screen drawing section 7, and autonomous rule editing operation section 8 may be realized by a computer which operates according to a program.

The autonomous rule storage section 4, autonomous collaborative work log storage section 5, system state monitoring section 2, countermeasure determination section 3, autonomous collaborative work operation control section 6, and autonomous collaborative work screen drawing section 7, and autonomous rule editing operation section 8 may be realized separately or in combination.

Third Exemplary Embodiment

FIG. 18 is a block diagram showing a third exemplary embodiment of the present invention. In FIG. 18, the same reference numerals as those in first and second exemplary embodiments denote the same components as those in FIGS. 1 and 11, and the descriptions thereof will be omitted here. A management supporting system according to the third exemplary embodiment includes an autonomous collaborative work log monitoring section 9 in addition to the components of the second exemplary embodiment.

The autonomous collaborative work log monitoring section 9 especially plays an important role in the present exemplary embodiment. The autonomous collaborative work log monitoring section 9 refers to the autonomous collaborative work logs stored in the autonomous collaborative work log storage section 5 and specifies an autonomous rule satisfying a condition, e.g., that the number of times the execution result of the action has failed exceeds a specified number. The autonomous collaborative work log monitoring section 9 presents the autonomous rule satisfying such a condition as an autonomous rule that is considered to be in great need of correction to an administrator through the autonomous rule editing operation section 8 and input/output device 1 to prompt the administrator to edit the autonomous rule. Hereinafter, the above operation of the autonomous collaborative work log monitoring section 9 will concretely be described.

The autonomous collaborative work log monitoring section 9 refers to the autonomous collaborative work logs stored in the autonomous collaborative work log storage section 5 to count up the number of histories (i.e., the number of applications of the action defined in the autonomous rule) in which the autonomous rule has been applied. Based on the counting result, the autonomous collaborative work log monitoring section 9 extracts the rule ID of an autonomous rule satisfying a given condition from the autonomous collaborative work logs.

"Given condition" includes, e.g., "the number of times the execution result of the action has failed exceeds a specified number", "the number of times the execution result of the action has failed more than a specified number of times in succession", "the success rate of the execution result of the action falls below a specified rate", and "the execution result has failed although it had previously succeeded more than a specified number". The given condition may include all or part of the above conditions. Further, a condition other than the above may be adopted as the given condition.

After extracting the rule ID of an autonomous rule satisfying a given condition, the autonomous collaborative work log monitoring section 9 outputs the rule ID to the autonomous rule editing operation section 8.

Upon input of the rule ID from the autonomous collaborative work log monitoring section 9, the autonomous rule editing operation section 8 extracts a log associated with the rule ID from the autonomous collaborative work log storage section 5 and, at the same time, extracts an autonomous rule corresponding to the rule ID from the autonomous rule storage section 4. Then, the autonomous rule editing operation section 8 outputs an operation screen for notifying an administrator that there exists an autonomous rule that is likely to have a problem (i.e., autonomous rule that is considered to be in great need of editing) to the input/output device 1.

Next, with fault countermeasure operation for a fault that has occurred in the system to be managed taken as an example of the autonomous collaborative work, management supporting operation (presenting operation of the autonomous rule that is considered to be in great need of editing) performed by the management supporting system will be described. In addition, an example of a screen that the autonomous rule editing operation section 8 generates will be described.

As in the case of the second exemplary embodiment, the autonomous rule editing operation section 8 displays the fault history list screen on the input/output device 1. However, in the case of the third exemplary embodiment, the autonomous rule editing operation section 8 receives as an input the rule ID of an autonomous rule satisfying a given condition from the autonomous collaborative work log monitoring section 9 and, based on the input information, displays the fault history list screen as shown in FIG. 19 on the input/output device 1.

It can be seen from a comparison between a fault history list screen 3101 shown in FIG. 19 and fault history list screen in the second exemplary embodiment (see FIG. 13), the screen 3101 additionally contains an "Autonomous rule failure report" tag 3102 at the tag menu area in the list upper portion. When the "Autonomous rule failure report" tag 3102 is mouse-clicked, the autonomous rule editing operation section 8 displays a screen containing a list 3103 (hereinafter, referred to merely as "autonomous rule list 3103") of autonomous rules that are considered to be in great need of correction, as shown in FIG. 19.

The autonomous rule list 3103 presents "Rule ID", "Condition", "Action", "Server (location of application of action)" and "Report" in units of an autonomous rule. "Condition", "Action", and "Server" can be identified by extracting an autonomous rule corresponding to the rule ID from the autonomous rule storage section 4. "Report" represents the number of times the execution result of the action has failed in succession, the total number of times the execution result of the action has failed, the success rate falling below a specified rate, or information that the execution result has failed although it had previously succeeded more than a specified number. "Report" can be derived from a part of the autonomous collaborative work log that is associated with the rule ID. Therefore, by receiving as an input the rule ID of an autonomous rule satisfying a given condition from the autonomous collaborative work log monitoring section 9, the autonomous rule editing operation section 8 can derive the autonomous rule list 3103 shown in FIG. 19.

Operator adminA refers to the autonomous rule list 3103, which is displayed by mouse-clicking the "Autonomous rule failure report" tag 3102 to thereby grasp the existence of an autonomous rule that is considered to be in great need of correction. For example, operator adminA refers to the autonomous rule list 3103 shown in FIG. 19 to thereby grasp, e.g., that "autonomous rule R0006 has failed five times in succession", or "autonomous rule 0003 has failed ten times in total". As a result, operator AdminA can clearly recognize the necessity of correcting the above autonomous rule. Further, operator AdminA can utilize the inadequate rule, i.e., the above failure case (autonomous rule listed in the autonomous rule list 3103) as a useful criterion at the editing time.

Further, operator adminA refers to the autonomous rule R0002 in the autonomous rule list to thereby grasp that an autonomous rule that had previously succeeded without problems has failed for some reason. Operator adminA compares/analyzes a previous success case and failure case of this time in order to find out the reason of the failure. When it is determined that the failure is caused, e.g., due to lack of a CPU memory capacity at the time of application of the rule as a result of the analysis, a condition in which the autonomous rule R0002 can be applied is corrected to thereby increase the reliability of the autonomous rule R0002. Further, assumed that it is determined that the failure is caused due to a change (OS version change or addition of a batch) of the system configuration of a location of application of the autonomous rule (serverA) and therefore the autonomous rule R0002 that had been effective before the change of the system configuration has not operated normally. In this case, operator adminA confirms the necessity of correction not only for the autonomous rule R0002 but also for the autonomous rule R0001 to be applied to the same server serverA. The operator can recognize the necessity of changing the autonomous rule as described above. Thus, it is possible to correct the autonomous rule that is likely to fail before the failure actually occurs.

The management supporting system according to the present invention need not provide the information "CPU memory capacity was insufficient at the time of application of the rule" or "system configuration has been changed" in the abovementioned example to the operator. The operator him or herself actually examines the system to be managed so as to find out the cause of the failure.

According to the management supporting system of the third exemplary embodiment, it is possible to extract an autonomous rule that has failed many times or autonomous rule that has suddenly failed although it had previously succeeded from the operation results (failure cases) of the autonomous system in a work flow which is partly automated by the introduction of the autonomous system. As a result, it is possible to clearly notify the operator having authority to edit the autonomous rule of the necessity for editing the autonomous rule. Further, as a result, it is possible to prompt the operator to adequately and speedy determine the start time of the autonomous rule edit operation, which may increase in the reliability of individual autonomous rule edit operation. Further, in the case where the system configuration change in a server forces all the autonomous rules applied to the server to be corrected, it is possible to remind the operator to confirm the necessity for the editing other relevant autonomous rules. Thus, it is possible to increase a possibility that an adequate autonomous rule can be maintained.

In the above description, the autonomous rule that is considered to be in great need of correction is presented by the autonomous rule list 3103 (see FIG. 9). The autonomous rule editing operation section 8 may present a dialogue when an administrator having authority to edit the autonomous rule logs in the management supporting system. FIGS. 20 and 21 are explanatory views each showing an example of a dialogue presenting an autonomous rule that is considered to be in great need of correction. FIGS. 20 and 21 each show a case where one autonomous rule is presented. Dialogues shown in FIGS. 20 and 21 each contain, as in the case of the autonomous rule list 3103 (see FIG. 19), "Rule ID", "Condition", "Action", "server (location of application of action)" and "Report". Information presented by the dialogues shown in FIGS. 20 and 21 may be transmitted by E-mail to a terminal apparatus (terminal apparatus may be one other than the input/output device 1) used by the operator.

When an autonomous rule is selected in the autonomous rule list 3103 shown in FIG. 19 and "Reference" button shown in FIG. 19 is depressed, the autonomous rule editing operation section 8 displays a screen presenting the detailed information of the selected autonomous rule. FIG. 22 shows this screen. The screen shown in FIG. 22 presents "Rule ID", "Condition", "Action", "Server", "Authorization" (whether authorization is required or not), as well as "Number of times of applications of action" "Number of times of successes" "Number of consecutive times of failures", and "Success rate". Further, the number of occurrences of failures to which the displayed autonomous rule has been applied is displayed.

When a "rule edit" button is mouse-clicked in the dialogues shown in FIGS. 20 and 21 or "rule edit" button is mouse-clicked on the screen shown in FIG. 22, the autonomous rule edit screen is displayed as in the case of step S203 (see FIG. 12) in the second exemplary embodiment followed by execution of steps subsequent to step S203.

In the present exemplary embodiment, as in the case of the first exemplary embodiment, the system state monitoring section 2, countermeasure determination section 3, autonomous collaborative work operation control section 6, autonomous collaborative work screen drawing section 7, autonomous rule editing operation section 8, and autonomous collaborative work log monitoring section 9 may each be realized by a hardware having a corresponding function. Alternatively, the system state monitoring section 2, countermeasure determination section 3, autonomous collaborative work operation control section 6, autonomous collaborative work screen drawing section 7, autonomous rule editing operation section 8, and autonomous collaborative work log monitoring section 9 may be realized by a computer which operates according to a program.

The autonomous rule storage section 4, autonomous collaborative work log storage section 5, system state monitoring section 2, countermeasure determination section 3, autonomous collaborative work operation control section 6, and autonomous collaborative work screen drawing section 7, autonomous rule editing operation section 8, and autonomous collaborative work log monitoring section 9 may be realized separately or in combination.

In the above exemplary embodiments, the application mode of the action includes: a mode in which the action is applied to the system to be managed by transmitting a command corresponding to the action to the system to be managed; a mode in which processing is executed in the system to be managed by executing a command corresponding to the action on the autonomous system; a mode in which a monitoring apparatus (not included in the management supporting apparatus according to the present invention) executes processing for the system to be managed by transmitting a command corresponding to the action to the monitoring apparatus; and a mode in which a setting file in the system to be managed is substituted in accordance with the action. A mode other than the above may be adopted.

In the exemplary embodiments described above, a rule storage section is realized by the autonomous rule storage section 4. A countermeasure execution means is realized by the system state monitoring section 2, countermeasure determination section 3 and autonomous collaborative work operation control section 6. A log storage section is realized by the autonomous collaborative work log storage section 5. An unresolved state display control means is realized by the autonomous collaborative work operation control section 6 and autonomous collaborative work screen drawing section 7. A resolved state display control means is realized by the autonomous rule editing operation section 8. A rule presentation means is realized by the autonomous collaborative work log monitoring section 9 and autonomous rule editing operation section 8.

INDUSTRIAL APPLICABILITY

The present invention is applicable to a management work (e.g., fault countermeasure work) for a system to be managed.

The invention claimed is:

1. A management supporting system for supporting management of a system to be managed, comprising:
   a rule storage section which stores a rule describing a countermeasure corresponding to a state of the system to be managed;
   an input/output section which displays a screen operable by an operator and receives as an input an instruction from the operator;
   countermeasure execution means for monitoring a state of the system to be managed, executing for the system to be managed a countermeasure corresponding to the state of the system to be managed based on the rule stored in the rule storage section and, in the case where an instruction is input to the input/output section from the operator, executing a countermeasure for the system to be managed according to the instruction;
   a log storage section which stores, in the same format, the operation of the countermeasure execution means executed according to the rule stored in the rule storage section and operation of the countermeasure execution means executed according to the instruction from the operator as logs;
   unresolved state display control means for displaying on the input/output section based on the logs stored in the log storage section a screen presenting information presenting a state which has occurred in the system to be managed and the problem solution for which has not yet been completed;
   a resolved state display control means for displaying on the input/output section based on the logs stored in the log storage section a screen presenting information concerning a state which has occurred in the system to be managed and the problem solution for which has been completed together with information of countermeasures executed for the problem solution and success/failure of the respective countermeasures, wherein the resolved state control means further displays a rule update operation screen prompting the operator to edit a rule, wherein the rule update operation screen includes (i) an automatically generated list of one or more countermeasures that have been previously applied by a human operator for the problem solution and (ii) success/failure of the respective one or more countermeasures previously applied by the human operator, and wherein the operator is prompted to select a countermeasure of the one or more countermeasures previously applied by the human operator to be subsequently used as a countermeasure for the state of the system to be managed; and
   a rule presentation means for specifying based on the logs stored in the log storage section a rule in which the result of a countermeasure to be executed for the system to be managed satisfies a given condition and displays on the input/output section a screen presenting the rule as one that is in need of correction.

2. The management supporting system according to claim 1, wherein after displaying the screen on the input/output section, the unresolved state display control means displays on the input/output section according to the operator's instruction a screen prompting the operator to input a countermeasure instruction for the state in which the problem solution has not yet been completed.

3. A management supporting method for supporting management of a system to be managed, comprising:
   a step of storing a rule describing a countermeasure corresponding to a state of the system to be managed;
   a countermeasure execution step of monitoring a state of the system to be managed, executing for the system to be managed a countermeasure corresponding to the state of the system to be managed based on the rule stored in the rule storage section and, in the case where an instruction is input from an operator through an input/output section which displays a screen operable by the operator and receives as an input an instruction from the operator, executing a countermeasure for the system to be managed according to the instruction;
   a step of storing, in the same format, the operation of the countermeasure execution means executed according to the rule stored in the rule storage section and operation of the countermeasure execution means executed according to the instruction from the operator as logs;
   an unresolved state display control step of displaying on the input/output section based on the logs stored in the log storage section a screen presenting information presenting a state which has occurred in the system to be managed and the problem solution for which has not yet been completed;
   a resolved state display control step of displaying on the input/output section based on the logs stored in the log storage section a screen presenting information concerning a state which has occurred in the system to be managed and the problem solution for which has been completed together with information of countermeasures executed for the problem solution and success/failure of the respective countermeasures, wherein said displaying includes displaying a rule update operation screen prompting the operator to edit a rule, wherein the rule update operation screen includes (i) an automatically generated list of one or more countermeasures that have been previously applied by a human operator for the problem solution and (ii) success/failure of the respective one or more countermeasures previously applied by the human operator, and wherein the operator is prompted to select a countermeasure of the one or more countermeasures previously applied by the human operator to be subsequently used as a countermeasure for the state of the system to be managed; and a step of specifying based on the logs stored in the log storage section a rule in which the result of a countermeasure to be executed for the system to be managed satisfies a given condition and displaying on the input/output section a screen presenting the rule as one that is in need of correction.

4. The management supporting method according to claim 3, wherein after displaying the screen on the input/output section, the unresolved state display control step displays on the input/output section according to the operator's instruction a screen prompting the operator to input a countermeasure instruction for the state in which the problem solution has not yet been completed.

5. A non-transitory computer-readable medium having stored therein a management supporting program, which when executed causes a device to perform operations comprising:

processing for storing a rule describing a countermeasure corresponding to a state of a system to be managed;

countermeasure execution processing for monitoring a state of the system to be managed, executing for the system to be managed a countermeasure corresponding to the state of the system to be managed based on the rule stored in the rule storage section and, in the case where an instruction is input from an operator through an input/output section which displays a screen operable by the operator and receives as an input an instruction from the operator, executing a countermeasure for the system to be managed according to the instruction;

processing for storing, in the same format, the operation of the countermeasure execution means executed according to the rule stored in the rule storage section and operation of the countermeasure execution means executed according to the instruction from the operator as logs;

unresolved state display control processing for displaying on the input/output section based on the logs stored in the log storage section a screen presenting information presenting a state which has occurred in the system to be managed and the problem solution for which has not yet been completed;

resolved state display processing for displaying on the input/output section based on the logs stored in the log storage section a screen presenting information concerning a state which has occurred in the system to be managed and the problem solution for which has been completed together with information of countermeasures executed for the problem solution and success/failure of the respective countermeasures, wherein said displaying includes displaying a rule update operation screen prompting the operator to edit a rule, wherein the rule update operation screen includes (i) an automatically generated list of one or more countermeasures that have been previously applied by a human operator for the problem solution and (ii) success/failure of the respective one or more countermeasures previously applied by the human operator, and wherein the operator is prompted to select a countermeasure of the one or more countermeasures previously applied by the human operator to be subsequently used as a countermeasure for the state of the system to be managed; and processing for specifying based on the logs stored in the log storage section a rule in which the result of a countermeasure to be executed for the system to be managed satisfies a given condition and displaying on the input/output section a screen presenting the rule as one that is in need of correction.

6. The non-transitory computer-readable medium according to claim 5, wherein the operations further comprise countermeasure input screen display processing for displaying on the input/output section according to the operator's instruction a screen prompting the operator to input a countermeasure instruction for the state in which the problem solution has not yet been completed.

7. A management supporting system for supporting management of a system to be managed, comprising:

a rule storage unit configured to store a rule describing a countermeasure corresponding to a state of the system to be managed;

an input/output unit configured to display a screen operable by an operator and receives as an input an instruction from the operator;

countermeasure execution unit configured to monitor a state of the system to be managed, executing for the system to be managed a countermeasure corresponding to the state of the system to be managed based on the rule stored in the rule storage unit and, in the case where an instruction is input to the input/output unit from the operator, execute a countermeasure for the system to be managed according to the instruction;

a log storage section configured to store, in the same format, the operation of the countermeasure execution unit executed according to the rule stored in the rule storage unit and operation of the countermeasure execution unit executed according to the instruction from the operator as logs;

unresolved state display controller configured to display on the input/output unit based on the logs stored in the log storage unit a screen presenting information presenting a state which has occurred in the system to be managed and the problem solution for which has not yet been completed;

a resolved state display controller configured to display on the input/output unit based on the logs stored in the log storage unit a screen presenting information concerning a state which has occurred in the system to be managed and the problem solution for which has been completed together with information of countermeasures executed for the problem solution and success/failure of the respective countermeasures, wherein said displaying includes displaying a rule update operation screen prompting the operator to edit a rule, wherein the rule update operation screen includes (i) an automatically generated list of one or more countermeasures that have been previously applied by a human operator for the problem solution and (ii) success/failure of the respective one or more countermeasures previously applied by the human operator, and wherein the operator is prompted to select a countermeasure of the one or more countermeasures previously applied by the human operator to be subsequently used as a countermeasure for the state of the system to be managed; and a rule presentation unit configured to specify based on the logs stored in the log storage unit a rule in which the result of a countermeasure to be executed for the system to be managed satisfies a given condition and displays on the input/output unit a screen presenting the rule as one that is in need of correction.

8. The management supporting system according to claim 7, wherein after displaying the screen on the input/output unit, the unresolved state display controller displays on the input/output unit according to the operator's instruction a screen prompting the operator to input a countermeasure instruction for the state in which the problem solution has not yet been completed.

* * * * *